United States Patent
Matsumoto et al.

(10) Patent No.: US 9,827,906 B2
(45) Date of Patent: Nov. 28, 2017

(54) IMAGE PROCESSING APPARATUS

(71) Applicant: FUJITSU TEN LIMITED, Kobe-shi, Hyogo (JP)

(72) Inventors: Yuuki Matsumoto, Kobe (JP); Atsushi Mino, Kobe (JP); Naoshi Kakita, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 142 days.

(21) Appl. No.: 14/793,080

(22) Filed: Jul. 7, 2015

(65) Prior Publication Data
US 2016/0021313 A1  Jan. 21, 2016

(30) Foreign Application Priority Data
Jul. 15, 2014  (JP) .................................. 2014-145323

(51) Int. Cl.
| | |
|---|---|
| *H04N 7/18* | (2006.01) |
| *B60R 1/00* | (2006.01) |
| *G06T 11/00* | (2006.01) |
| *G06T 7/269* | (2017.01) |

(52) U.S. Cl.
CPC ............... *B60R 1/00* (2013.01); *G06T 7/269* (2017.01); *G06T 11/00* (2013.01); *B60R 2300/305* (2013.01); *B60R 2300/806* (2013.01); *G06T 2207/30252* (2013.01)

(58) Field of Classification Search
CPC ............ B60R 1/00; G06T 7/269; G06T 11/00
See application file for complete search history.

(56) References Cited

U.S. PATENT DOCUMENTS

| | | | |
|---|---|---|---|
| 2014/0148971 A1* | 5/2014 | Sobue | B62D 15/0275 701/1 |
| 2014/0160287 A1* | 6/2014 | Chen | G08G 1/168 348/148 |

FOREIGN PATENT DOCUMENTS

| | | |
|---|---|---|
| JP | 2009-017462 A | 1/2009 |
| JP | 2012-066700 A | 4/2012 |

* cited by examiner

*Primary Examiner* — Tat Chio
(74) *Attorney, Agent, or Firm* — Oliff PLC

(57) ABSTRACT

An image processing apparatus that processes an image includes: an image acquisition portion that acquires a captured image from an imaging apparatus which captures an image of a vicinity of a vehicle; and an image generator that generates a display image in which a support image for supporting driving is superimposed on the acquired captured image captured by the imaging apparatus, the image generator being configured to (i) make a determination as to whether the vehicle is in a stopped state or a moving state, and (ii) select a type of the support image to be superimposed on the acquired captured image in the display image based on the determination as to whether the vehicle is in the stopped state or the moving state.

10 Claims, 29 Drawing Sheets

| VEHICLE STATE | DRAWING MODE | FIXED GUIDE LINE | PREDICTED GUIDE LINE |
|---|---|---|---|
| FIRST | A | DRAWN | NON-DRAWN (LENGTH ADJUSTMENT MAGNIFICATION 0.0) |
| SECOND | B | DRAWN | DRAWN (LENGTH ADJUSTMENT MAGNIFICATION 1.0) |
| THIRD | C | DRAWN | DRAWN (LENGTH ADJUSTMENT MAGNIFICATION 1.0→0.0) |
| FOURTH | D | DRAWN | DRAWN (LENGTH ADJUSTMENT MAGNIFICATION 0.0→1.0) |

FIG.22

IMAGE PROCESSING APPARATUS

BACKGROUND OF THE INVENTION

Field of the Invention

The present invention relates to a technique for supporting driving of a vehicle.

Description of the Background Art

In the related art, various driving support systems for supporting driving of a vehicle such as an automobile have been proposed. As such driving support systems, there is a driving support system which displays a guide line in order to support an operation in which a vehicle is moved in reverse and is then parked within a parking range. For example, there is a driving support system which displays a guide line corresponding to a predicted passing area of a vehicle by using a rotation angle or a vehicle speed which is estimated on the basis of a movement vector derived from an image, the image being obtained from a camera provided in the vehicle.

However, in the related art, display when a vehicle is moving is disclosed, but display when the vehicle is stopped or a state of changing from movement to stoppage is not taken into consideration. If the previous guide line is displayed even when the state of the vehicle changes from movement to stoppage, there is a possibility that the vehicle may travel in a direction different from the guide line when subsequent movement is performed since angles of tires change in a case where a steering wheel is rotated during the stoppage. In other words, wrong information is provided to a driver, and thus there is a problem as a system for supporting driving.

SUMMARY OF THE INVENTION

According to an aspect of the invention, an image processing apparatus that processes an image includes: an image acquisition portion that acquires a captured image from an imaging apparatus which captures an image of a vicinity of a vehicle; and an image generator that generates a display image in which a support image for supporting driving is superimposed on the acquired captured image captured by the imaging apparatus, the image generator being configured to (i) make a determination as to whether the vehicle is in a stopped state or a moving state, and (ii) select a type of the support image to be superimposed on the acquired captured image in the display image based on the determination as to whether the vehicle is in the stopped state or the moving state.

Since different support images are superimposed depending on the moving state or the stopped state of the vehicle, different images can be displayed when the vehicle is in the moving state and the stopped state. As a result, it is possible to accurately support driving without displaying a display image during the moving state despite the stopped state.

According to another aspect of the invention, the types of the support image include a first support image in which a line is drawn in a predefined region and a second support image in which a line is drawn along a predicted movement path of the vehicle, and the image generator generates the display image in which the first support image and the second support image are superimposed on the acquired captured image when the vehicle is in the moving state, and generates the display image in which the first support image, but not the second support image, is superimposed on the acquired captured image when the vehicle is in the stopped state.

Since a display image is generated through superimposition of the first support image in the stopped state, it is possible to accurately support driving without using the second support image in which a line of a movement path used for display in the moving state is drawn.

Therefore, an object of the present invention is to provide a technique capable of accurately supporting driving in consideration of each of a moving state and a stopped state of a vehicle.

These and other objects, features, aspects and advantages of the present invention will become more apparent from the following detailed description of the present invention when taken in conjunction with the accompanying drawings.

BRIEF DESCRIPTION OF THE DRAWINGS

FIG. 22 is a diagram illustrating a guide line to be drawn.

DESCRIPTION OF THE EMBODIMENTS

Hereinafter, an embodiment of the present invention will be described with reference to the drawings.

<1. Embodiment>

<1-1. Configuration of System>

Figure 1:
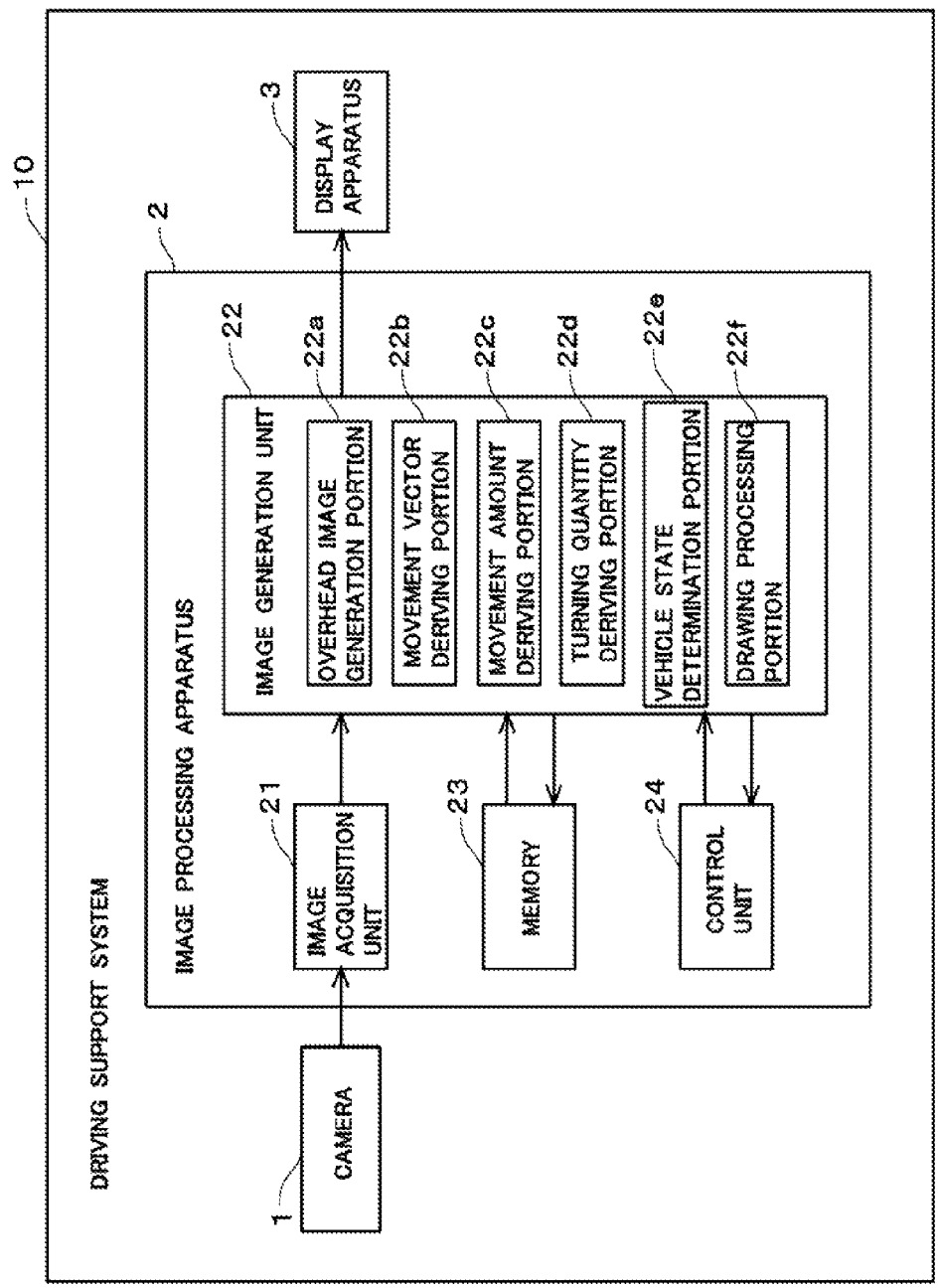
FIG. 1 is a block diagram of a driving support system.

First, a description will be made of a configuration of a driving support system 10 according to the present exemplary embodiment. FIG. 1 is a block diagram illustrating a schematic configuration of the driving support system 10. The driving support system 10 includes a camera 1, an image processing apparatus 2, and a display apparatus 3. The driving support system 10 is mounted in a vehicle such as an automobile and has a function of deriving a movement amount, a turning quantity, or the like of the vehicle. In addition, the driving support system 10 has a function of displaying, for example, a guide line for supporting parking by using the derived movement amount, the derived turning quantity, or the like. Hereinafter, a vehicle in which the driving support system 10 is mounted is referred to as a "host vehicle".

The camera 1 captures an image of the vicinity of the host vehicle and obtains a captured image. The camera 1 includes a lens and an imaging element, and electronically acquires a captured image. The camera 1 continuously acquires a captured image at a predetermined cycle (for example, a cycle of ⅟₃₀ seconds). The camera 1 is provided on, for example, a rear part of the host vehicle and is used as a back camera which images a back side of the vehicle. The present invention is not limited thereto, but a camera which performs imaging in another direction may be employed, and a plurality of cameras may be used.

Figure 2:
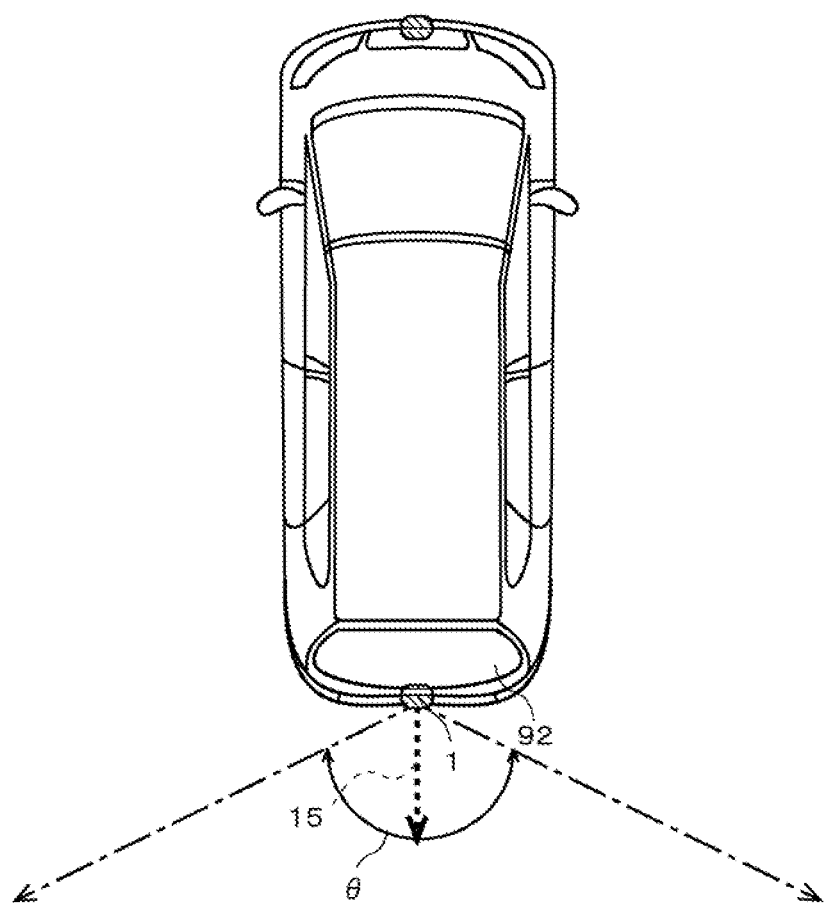
FIG. 2 is a diagram illustrating an imaging direction of a camera.

FIG. 2 is a diagram illustrating a direction in which the camera 1 performs imaging in a case where the camera 1 is used as a back camera. As illustrated in FIG. 2, the camera 1 is provided in a rear door 92 at a rear end of the host vehicle, and an optical axis 15 thereof is directed backward of the front and rear directions of the host vehicle. Therefore, the camera 1 captures an image of the back side of the host vehicle so as to acquire a captured image showing a state of the back side of the host vehicle. A fish-eye lens is employed as the lens of the camera 1, and the camera 1 has an angle of view of about 135 degrees. For this reason, the camera 1 can image an area in a range of about 135 degrees in a horizontal direction extending to the back side of the host vehicle.

The driving support system 10 derives a movement amount or a turning quantity by using the captured image obtained by the camera 1. The driving support system 10 estimates a traveling direction by using the derived movement amount or turning quantity, and displays an image in which the estimated traveling direction is displayed on the captured image in a superimposition manner as a guide line, on the display apparatus 3. Consequently, a user can easily recognize the path along which the host vehicle is expected to move from now on.

Figure 3:
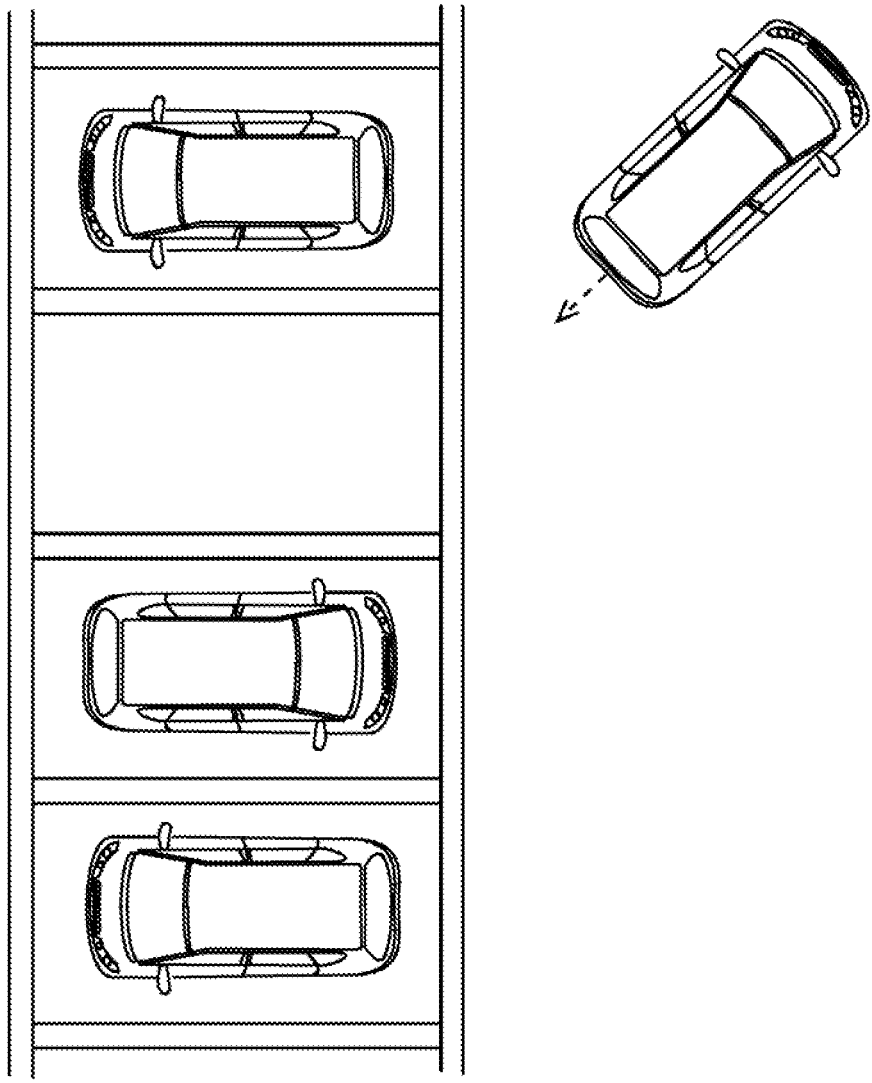
FIG. 3 is a diagram illustrating a situation in which the driving support system is used.
Figure 4:
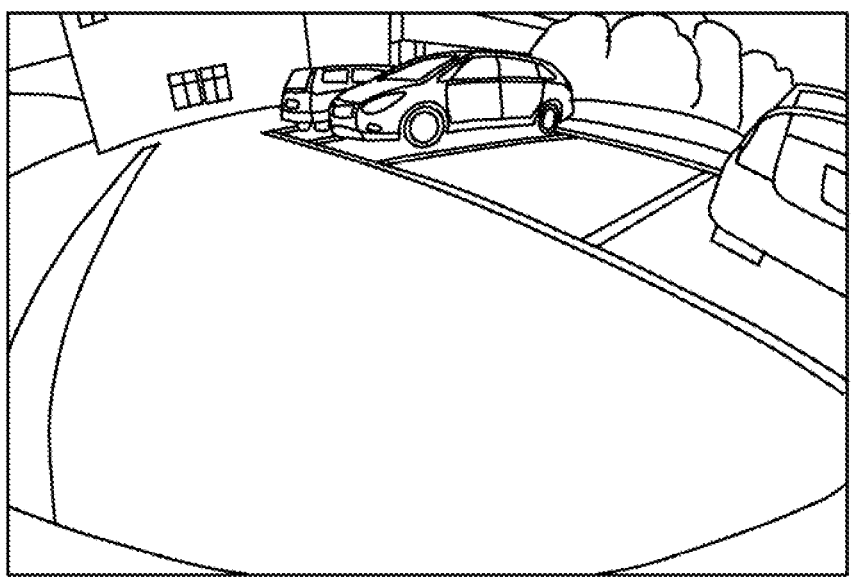
FIG. 4 is a diagram illustrating a captured image of a rear side of a host vehicle.

FIG. 3 is a diagram illustrating an example of a situation in which the driving support system 10 is used. FIG. 3 illustrates a situation in which the host vehicle is being parked in a parking lot. FIG. 3 illustrates a middle state of the parking operation in the parking lot, and a captured image obtained by capturing an image of a back side of the host vehicle with the camera 1 in this case is as illustrated in FIG. 4, for example.

Referring to FIG. 1 again, the image processing apparatus 2 generates a display image on the basis of the captured image acquired by the camera 1, and outputs the display image to the display apparatus 3. The image processing apparatus 2 includes an image acquisition unit 21, an image generation unit 22, a memory 23, and a control unit 24.

The image acquisition unit 21 temporally continuously acquires analog or digital captured images from the camera 1 at a predetermined cycle (for example, a cycle of ⅟₃₀ seconds). In a case where the acquired captured image is an analog image, the image acquisition unit 21 converts (A/D converts) the analog captured image into a digital captured image. One of captured images processed by the image acquisition unit 21 is one frame of video signals.

The image generation unit 22 performs a process of deriving a movement amount or a turning quantity by using the captured image acquired by the image acquisition unit 21 and generating a display image. For example, a hardware circuit such as an ASIC or an FPGA which can perform such a predetermined process is used as the image generation unit 22. The image generation unit 22 includes an overhead image generation portion 22a, a movement vector deriving portion 22b, a movement amount deriving portion 22c, a turning quantity deriving portion 22d, a vehicle state determination portion 22e, and a drawing processing portion 22f.

The overhead image generation portion 22a has a function of generating an overhead image from the captured image acquired by the image acquisition unit 21. For example, the overhead image generation portion 22a converts a viewpoint position of the captured image acquired by the image acquisition unit 21 into an upper side of the vehicle so as to redraw the captured image, thereby generating an overhead image. The overhead image generated by the overhead image generation portion 22a is stored in the memory 23.

The movement vector deriving portion 22b has a function of deriving a movement vector of the vehicle by using the overhead image generated by the overhead image generation portion 22a. For example, the movement vector deriving portion 22b extracts portions displaying the same subject from respective overhead images which are generated from temporally successive captured images, and derives a movement vector on the basis of a relationship between display positions.

The movement amount deriving portion 22c has a function of deriving a movement amount of the host vehicle by using the movement vector derived by the movement vector deriving portion 22b. The movement vector derived by the movement vector deriving portion 22b includes a movement vector of a road surface and a movement vector of a solid object. The movement vector of the road surface is a vector indicating an amount or a direction in which a road surface portion is moved. A movement amount of the host vehicle corresponds to the movement vector of the road surface, and thus the movement amount deriving portion 22c extracts the movement vector of the road surface included in the derived movement vector, and derives a movement amount of the host vehicle on the basis of the movement vector of the road surface.

The turning quantity deriving portion 22*d* has a function of deriving a turning quantity of the host vehicle by using the movement vector derived by the movement vector deriving portion 22*b*. The turning quantity in the present embodiment is a concept including a turning direction, a turning angle, a translation amount, and the like, which will be described later. The turning quantity deriving portion 22*d* extracts the movement vector of the road surface included in the derived movement vector in the same manner as the movement amount deriving portion 22*c*, and derives a turning quantity of the host vehicle on the basis of the movement vector of the road surface. The turning quantity deriving portion 22*d* also has a function of predicting a movement path of the host vehicle on the basis of the derived turning quantity.

The vehicle state determination portion 22*e* has a function of determining a host vehicle state on the basis of the turning quantity derived by the turning quantity deriving portion 22*d*. The host vehicle state indicates, for example, a moving state or a stopped state of the host vehicle. In other words, the vehicle state determination portion 22*e* determines whether the host vehicle is moving or stopped.

The drawing processing portion 22*f* generates a display image in which a guide line for supporting driving is drawn on the captured image acquired by the image acquisition unit 21, converts the display image into a video signal with a predetermined format such as NTSC, and outputs the video signal to the display apparatus 3. The drawing processing portion 22*f* changes the type of guide line or a length thereof to be drawn depending on a vehicle state determined by the vehicle state determination portion 22*e*.

For example, in a case where the host vehicle is stopped, the drawing processing portion 22*f* generates a display image in which a predefined guide line is superimposed on a captured image and outputs the display image to the display apparatus 3. In addition, in a case where the host vehicle is moving, the drawing processing portion 22*f* generates a display image in which the predefined guide line and a guide line indicating a predicted movement path are superimposed on a captured image and outputs the display image to the display apparatus 3. In other words, display images in which different guide lines are superimposed are generated in a case where the host vehicle is stopped and in a case where the host vehicle is moving. Consequently, a display image on which a guide line corresponding to a host vehicle state is drawn is displayed on the display apparatus 3.

Details of respective processes performed by the overhead image generation portion 22*a*, the movement vector deriving portion 22*b*, the movement amount deriving portion 22*c*, the turning quantity deriving portion 22*d*, the vehicle state determination portion 22*e*, and the drawing processing portion 22*f* will be described later.

The memory 23 stores an overhead image generated by the overhead image generation portion 22*a*. In the present embodiment, the movement vector deriving portion 22*b* derives a movement vector by using a plurality of overhead images whose capturing timings are different from each other. For this reason, the memory 23 stores not only the latest overhead image but also past overhead images. In other words, the memory 23 stores overhead images required to derive a movement vector. As the memory 23, a volatile semiconductor memory or a nonvolatile semiconductor memory may be used. However, other storage media may be used, and the memory 23 may be configured of a hard disk drive including a magnetic disk.

The control unit 24 is, for example, a microcomputer including a CPU, a RAM, a ROM, and the like, and controls the respective units of the image processing apparatus 2 including the image generation unit 22. Various functions of the control unit 24 are realized by software. In other words, the functions of the control unit 24 are realized by the CPU performing calculation processes (execution of a program) according to the program stored in the ROM or the like.

The display apparatus 3 is disposed at a position where a user (mainly, a driver) inside the host vehicle can visually recognize the display apparatus 3, and informs the user of various information pieces. Particularly, in the present embodiment, the display apparatus 3 has a function of displaying a display image for supporting driving. In addition, the display apparatus 3 may have a navigation function of guiding a route to a destination or a touch panel function of receiving a user's operation.

<1-2. Process in System>

Figure 5:
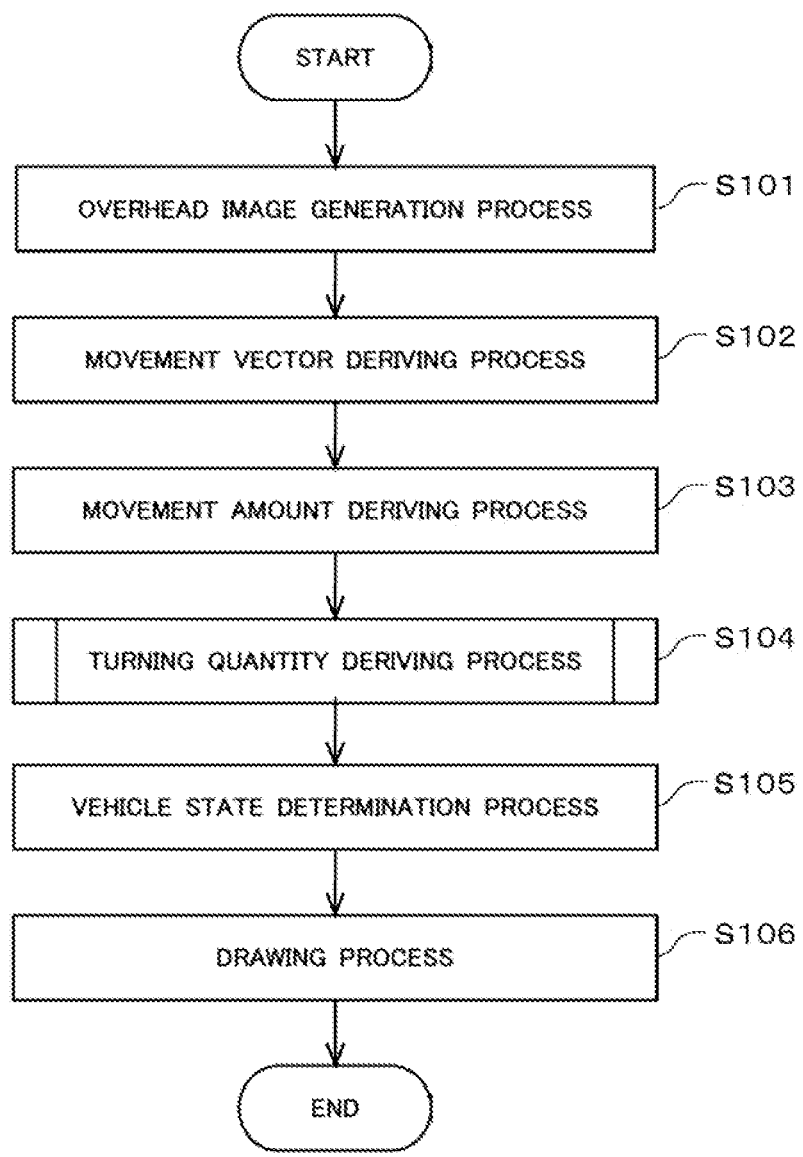
FIG. 5 is a flowchart illustrating a process in the driving support system.

Next, a process in the driving support system 10 will be described. FIG. 5 is a flowchart illustrating a process in the driving support system 10.

If a predetermined condition is satisfied, such as a case where a starting instruction is input or a case where a transmission gear of the host vehicle enters a reverse (R) state, the image acquisition unit 21 acquires a captured image from the camera 1 and outputs the captured image to the image generation unit 22. In addition, the image generation unit 22 performs an overhead image generation process (step S101).

Specifically, first, the overhead image generation portion 22*a* acquires data regarding a captured image from the image acquisition unit 21. The captured image has the optical axis of the camera 1 as a viewpoint direction, and thus the overhead image generation portion 22*a* generates an overhead image obtained when the captured image is viewed from the top by converting the viewpoint direction. A method of generating an overhead image by using a captured image from the camera may employ an existing method.

The overhead image generation portion 22*a* generates an overhead image corresponding to each captured image acquired by the image acquisition unit 21. In other words, the overhead image generation portion 22*a* generates an overhead image from the captured image for each frame. In addition, the overhead image generation portion 22*a* stores the generated overhead image in the memory 23.

Figure 6A:
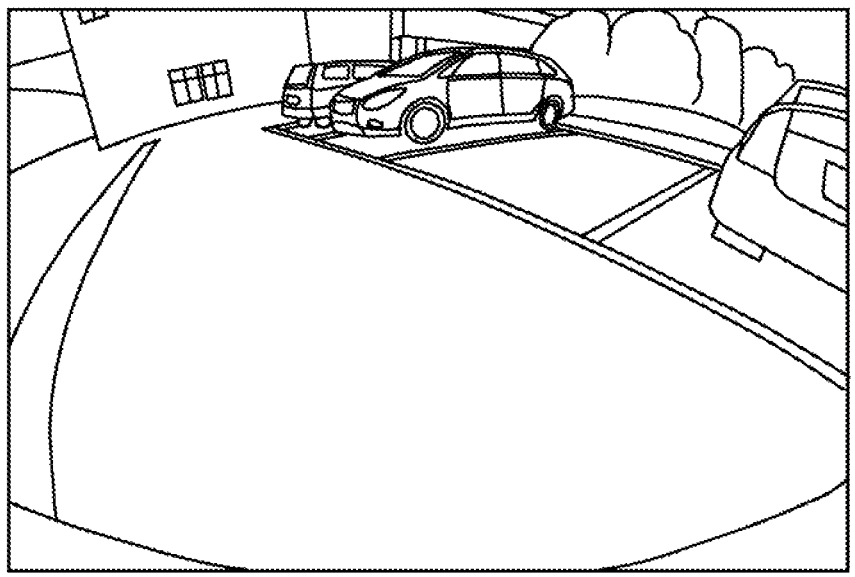
FIG. 6A is a diagram illustrating a captured image.
Figure 6B:
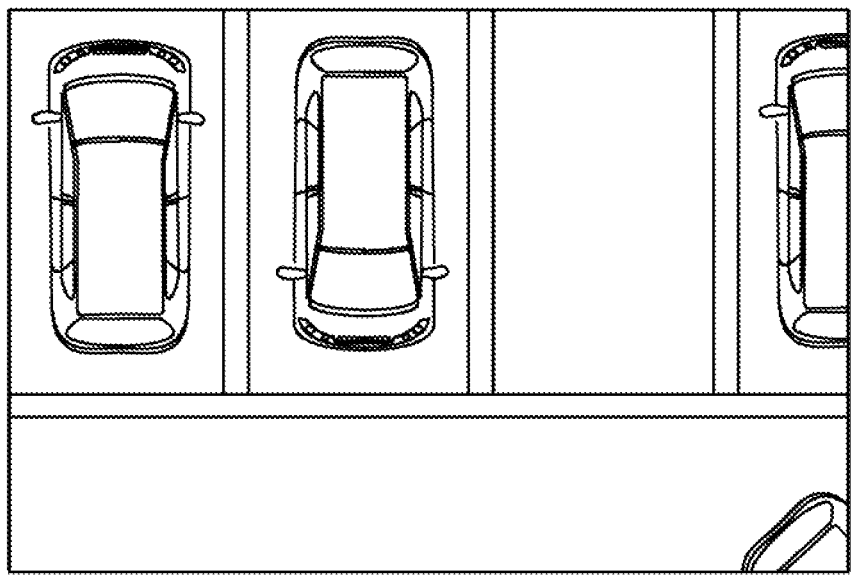
FIG. 6B is a diagram illustrating an overhead image.

Here, a description will be made with reference to FIGS. 6A and 6B. FIG. 6A illustrates a captured image obtained by the camera 1, and FIG. 6B illustrates an overhead image generated from the captured image. When a captured image as illustrated in FIG. 6A is acquired from the image acquisition unit 21, the overhead image generation portion 22*a* converts the viewpoint of the captured image so as to generate an overhead image as illustrated in FIG. 6B. The overhead image generation portion 22*a* generates an overhead image for each captured image of a different frame.

Referring to FIG. 5, next, the image generation unit 22 performs a movement vector deriving process (step S102). This process is a process in which the movement vector deriving portion 22*b* derives a movement vector by using an overhead image generated by the overhead image generation portion 22*a*.

Specifically, the movement vector deriving portion 22*b* acquires an overhead image of the current frame generated by the overhead image generation portion 22*a* and also acquires an overhead image of the previous frame stored in the memory 23. The movement vector deriving portion 22b compares the overhead images of the successive frames with each other and extracts pixels displaying the same subject from each overhead image. The movement vector deriving portion 22b derives a movement vector by connecting a position (coordinates) of a pixel extracted from the previous frame to a position (coordinates) of a pixel extracted from the subsequent frame. In other words, the movement vector is a vector obtained by connecting successive points to each other which correspond to results of the same subject having moved on the overhead images.

As a method of extracting pixels displaying the same subject, for example, a template matching method may be used. The template matching method is a method of finding a position similar to a position of template image designated in advance from an image. In a case where the template matching method is used in the present embodiment, for example, a process, in which a part of an overhead image of the previous frame is used as a template and is compared with an overhead image of the subsequent frame, may be performed on the entire image. As such a template matching method, for example, a method such as sum of absolute difference (SAD) or sum of squared difference (SSD) may be used.

In addition, not only the template matching method but also a feature point method may be used. The feature point method is a method using a so-called optical flow. In other words, feature points are extracted from respective overhead images which are generated by using a plurality of captured images which are acquired at different points in time, and an optical flow indicating motions of the feature points among a plurality of overhead images is derived. The feature point is a point which can be conspicuously detected and is a point such as a corner (an intersection between edges) of an object. In this feature point method, a feature point extracted from the most recent overhead image is correlated with a feature point extracted from a past overhead image which is used as a reference, and a movement vector is derived on the basis of positions of the feature points correlated with each other.

Figure 7:
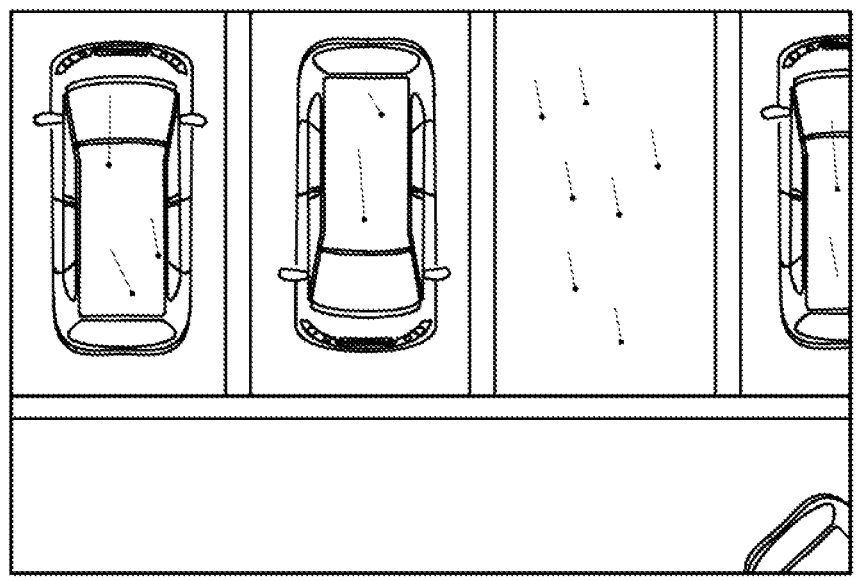
FIG. 7 is a diagram illustrating a method of deriving a movement vector.

Here, a description will be made of a method of deriving a movement vector with reference to FIG. 7. FIG. 7 is a diagram illustrating a method of deriving a movement vector by using the feature point method. FIG. 7 illustrates an overhead image which is the same as the overhead image generated from the captured image, illustrated in FIG. 6B. As illustrated in FIG. 7, black circles indicating feature points, and paths along which the feature points are moved from positions in the previous frame to positions in the subsequent frame, are shown. The movement vector deriving portion 22b derives directions and distance in which the feature points are moved movement vectors.

Referring to FIG. 5 again, next, the image generation unit 22 performs a movement amount deriving process (step S103). This process is a process in which the movement amount deriving portion 22c derives an actual movement amount of the host vehicle by using the movement vector derived by the movement vector deriving portion 22b.

An image obtained by capturing an image of the vehicle vicinity with the camera 1 frequently includes both a portion displaying a road surface and a portion displaying a solid object such as an automobile. The road surface is a plane and is not a moving object, and thus movement vectors of the road surface all have substantially the same direction and substantially the same magnitude. On the other hand, movement vectors of the solid object have different directions and magnitudes depending on a movement direction or a height of the solid object.

For this reason, the movement vectors of the solid object do not accurately reflect a movement amount of the host vehicle, and the movement vectors of the road surface accurately reflect a movement amount of the host vehicle. Therefore, movement vectors derived by the movement vector deriving portion 22b include movement vectors having various directions and magnitudes, but, in order to accurately derive a movement amount of the host vehicle, a movement vector of the road surface is required to be extracted therefrom.

Generally, a captured image of the vehicle vicinity includes a portion displaying the road surface for the most part, and thus the number of movement vectors of the road surface is typically largest. Therefore, in the present embodiment, a histogram regarding magnitude is generated for all movement vectors, and a movement vector whose number is largest is extracted as a movement vector of the road surface. The movement amount deriving portion 22c derives the magnitude of the extracted movement vector of the road surface as a movement amount of the host vehicle.

Figure 8:
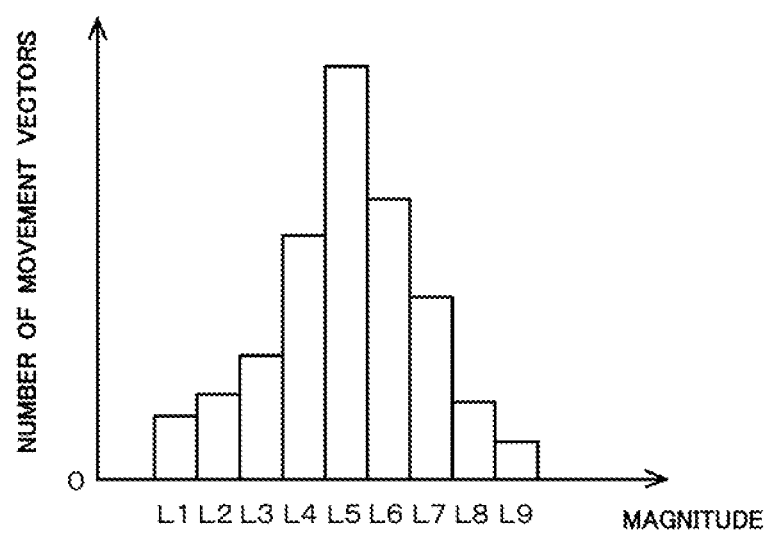
FIG. 8 is a diagram illustrating a histogram of a movement vector.

Here, a detailed description thereof will be made with reference to the drawings. FIG. 8 is a diagram illustrating a histogram regarding magnitudes of all movement vectors. The histogram illustrated in FIG. 8 is obtained by dividing a magnitude of a movement vector into length ranges of L1 to L9, sorting all movement vectors according to their magnitudes, and integrating the number of the movement vectors. As illustrated in FIG. 8, the magnitude in which the number of movement vectors is largest is L5. For this reason, the movement amount deriving portion 22c determines that a movement vector of the road surface is included in L5. In other words, the movement amount deriving portion 22c can extract a movement vector of the road surface.

The movement amount deriving portion 22c derives the magnitude of the extracted movement vector of the road surface as a movement amount of the host vehicle. In other words, in the case of FIG. 8, L5 is derived as a movement amount of the host vehicle.

Referring to FIG. 5 again, next, the image generation unit 22 performs a turning quantity deriving process (step S104). This process is a process in which the turning quantity deriving portion 22d derives an actual turning quantity of the host vehicle by using the movement vector of the road surface derived by the movement vector deriving portion 22b. A detailed description thereof will be described with reference to the drawings.

Figure 9:
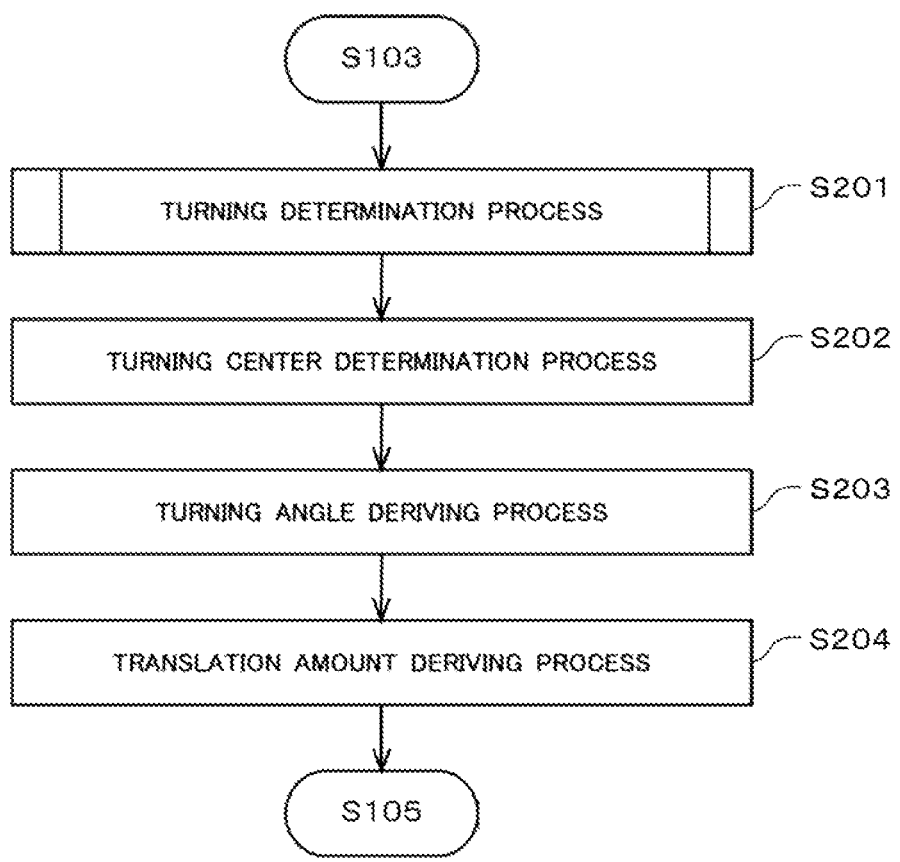
FIG. 9 is a flowchart illustrating a turning quantity deriving process.

FIG. 9 is a flowchart illustrating the turning quantity deriving process. As illustrated in FIG. 9, first, the turning quantity deriving portion 22d performs a turning determination process (step 5201). The turning determination process is a process of determining whether the host vehicle is turning or is moving straight. In addition, in the turning determination process, in a case where the host vehicle is turning, a turning direction is also determined.

Figure 10:
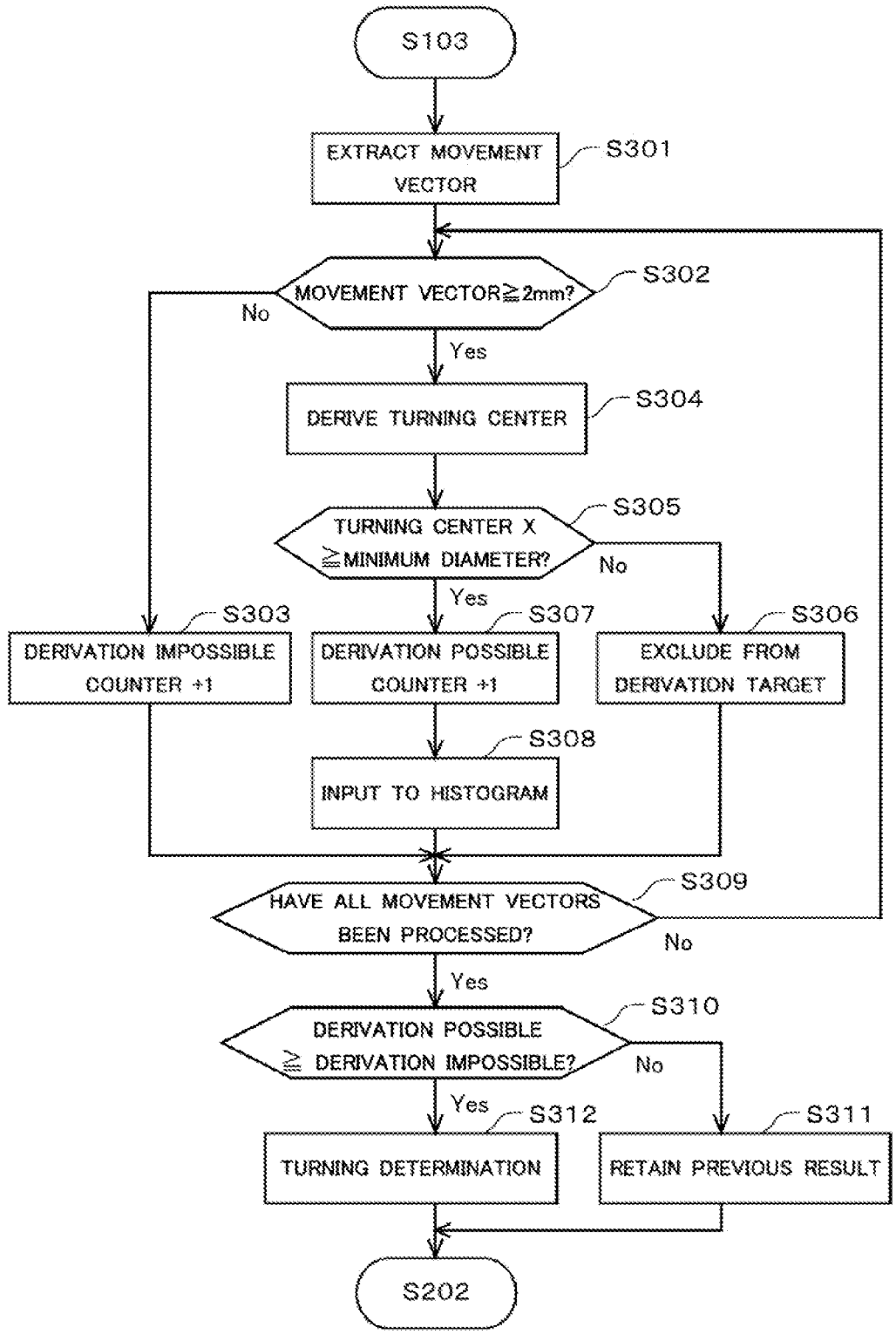
FIG. 10 is a flowchart illustrating a turning determination process.

Here, the turning determination process will be described in detail. FIG. 10 is a flowchart illustrating the turning determination process. As illustrated in FIG. 10, first, the turning quantity deriving portion 22d extracts movement vectors used in the turning determination process (step S301). Specifically, the turning quantity deriving portion 22d extracts all movement vectors of which end points are included in a specific region among the derived movement vectors. The specific region is not particularly limited as long as the region is suitable for deriving a turning quantity of the host vehicle, but the specific region may be, for example, a region of 2 m on each side and a depth of 4 m from a position of the camera in an overhead image. In other words, in this case, the turning quantity deriving portion 22d extracts all movement vectors of which end points are included in a region corresponding to four sides of 4 m×4 m from the rear end of the host vehicle in the overhead image.

Next, the turning quantity deriving portion 22d determines whether or not the movement vector is 2 mm or more (step S302). Specifically, the turning quantity deriving portion 22d determines whether or not a length of the extracted movement vector is 2 mm or more. This determination is performed in order to exclude a movement vector of which a length is below 2 mm since the movement vector has a small movement amount and thus has a high possibility that an error may increase in a procedure of deriving a turning quantity.

Therefore, in a case where a movement vector is below 2 mm (No in step S302), the turning quantity deriving portion 22d increments a derivation impossible counter by "1" without using the movement vector in deriving a turning quantity (step S303). The derivation impossible counter is used to count the number of movement vectors which are not used for deriving a turning quantity since a movement amount thereof is small.

On the other hand, in a case where a movement vector is equal to or larger than 2 mm (Yes in step S302), the turning quantity deriving portion 22d derives a turning center for the movement vector (step S304). The derivation of the turning center is a process of deriving a turning center position of the movement vector, that is, a turning center position when the host vehicle is moving.

Figure 11:
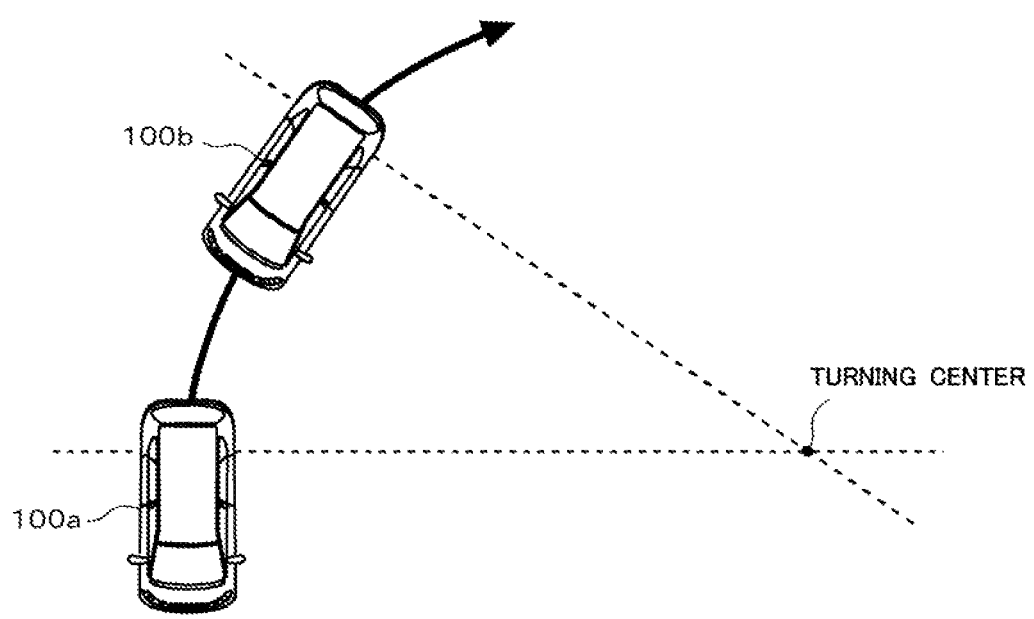
FIG. 11 is a diagram illustrating a method of deriving a turning center.

Here, a detailed description will be made of a process of deriving a turning center. FIG. 11 is a diagram illustrating a concept for deriving a turning center. FIG. 11 illustrates a situation in which the host vehicle at a certain position 100a is turning to another position 100b. As illustrated in FIG. 11, a turning center when the host vehicle is turning is present on a straight line which connects the rear wheels of the host vehicle to each other.

Figure 12:
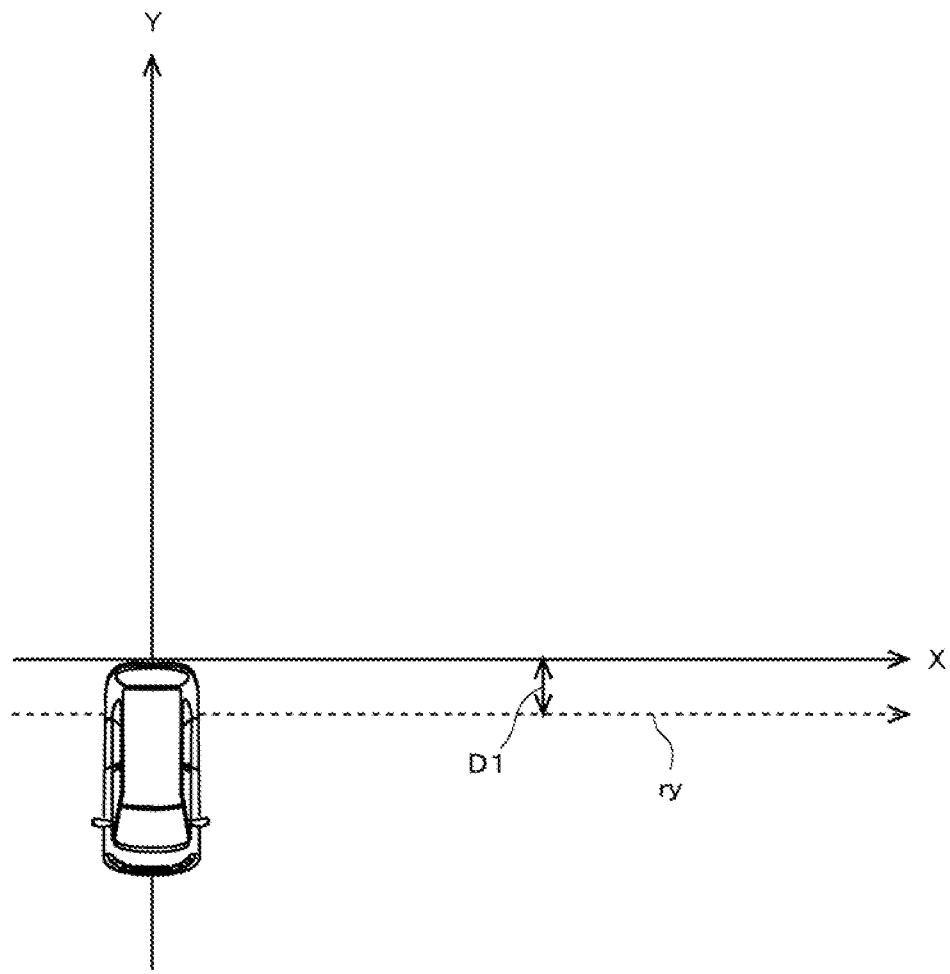
FIG. 12 is a diagram illustrating a method of deriving a turning center.

FIG. 12 is a diagram illustrating a world coordinate system. Specifically, FIG. 12 illustrates a world coordinate system in which a position of the camera is set as an origin, a viewpoint direction of the camera is set as a Y axis, and a horizontal direction of the host vehicle is set as an X axis in a case where the camera is provided at the rear part of the host vehicle. A distance D1 from the rear part (the installation position of the camera, that is, the origin of the world coordinate system) of the host vehicle to the rear wheels is a value which can be derived from vehicle information. The distance D1 corresponds to a Y coordinate of the turning center. In other words, the Y coordinate of the turning center is a known value (−D1). A straight line which passes through the Y coordinate of the turning center and is parallel to the X axis of the world coordinate system is set as a straight line ry.

Figure 13:
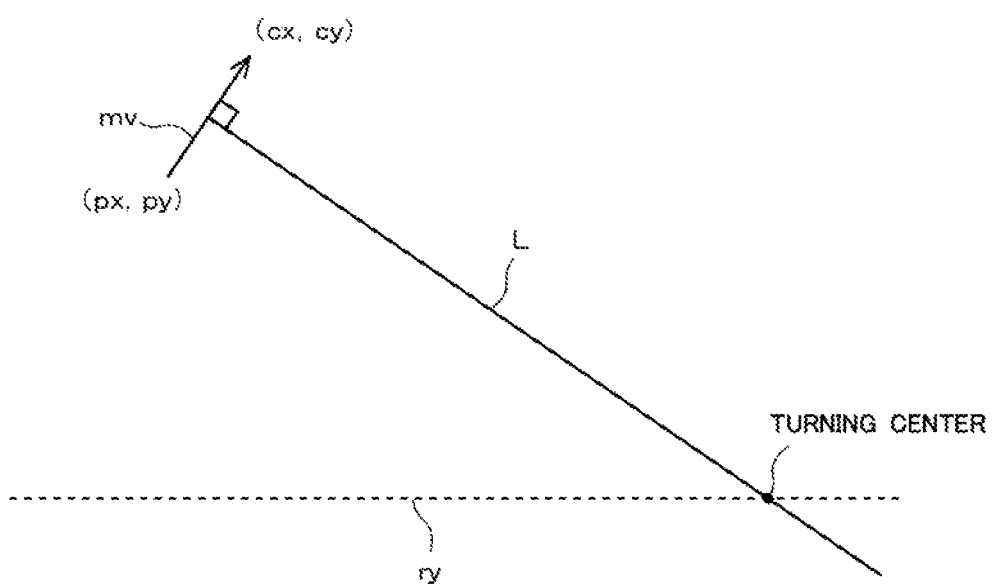
FIG. 13 is a diagram illustrating a method of deriving a turning center.

The Y coordinate of the turning center is the known value, and thus a description will be made of a process of deriving an X coordinate of the turning center with reference to the drawings. FIG. 13 is a diagram illustrating the process of deriving the X coordinate of the turning center. As an example, a description will be made of a process in which the turning quantity deriving portion 22d derives an X coordinate of the turning center by using an extracted movement vector my of the road surface. The movement vector my illustrated in FIG. 13 is a vector which has (px,py) as coordinates of a start point and has (cx,cy) as coordinates of an end point.

In this case, a slope A of a straight line L perpendicular to the movement vector my is derived by using Equation (1).

$$\text{Slope } A = (cx-px)/(cy-py) \times (-1) \quad (1)$$

If an X coordinate of the midpoint of the movement vector my is set as a midpoint X, the midpoint X is derived by using Equation (2). Similarly, if a Y coordinate of the midpoint of the movement vector my is set as a midpoint Y, the midpoint Y is derived by using Equation (3).

$$\text{Midpoint } X = (cx-px)/2 + px \quad (2)$$

$$\text{Midpoint } Y = (cy-py)/2 + py \quad (3)$$

In addition, if the Y-intercept of the straight line L perpendicular to the movement vector my is set as an intercept B, the intercept B is derived by using Equation (4).

$$\text{Intercept } B = \text{midpoint } Y - \text{slope } A \times \text{midpoint } X \quad (4)$$

An X coordinate of a point (that is, an X coordinate of the turning center) at which the straight line L intersects the straight line ry is derived by using Equation (5).

$$X \text{ coordinate of turning center} = (Y \text{ coordinate of turning center} - \text{intercept } B)/\text{slope } A \quad (5)$$

Consequently, an X coordinate and a Y coordinate of the turning center related to the movement vector my are derived.

Referring to FIG. 10 again, next, the turning quantity deriving portion 22d determines whether or not the X coordinate of the turning center (hereinafter, referred to as a "turning center X") is equal to or greater than the minimum diameter (step S305). The minimum diameter indicates a diameter in which the host vehicle is turning when the steering wheel is turned to the maximum limit, that is, the minimum rotation diameter of the vehicle. Since a value of the derived turning center X indicates a turning diameter of the movement vector my, in a case where the value of the turning center X is smaller than the minimum diameter, there is a high probability that this does not indicate a turning diameter of the host vehicle or the value is an error value.

Therefore, the turning quantity deriving portion 22d determines whether or not the turning center X is equal to or greater than the minimum diameter, and excludes the movement vector from a turning quantity derivation target (step S306) if the turning center X is smaller than the minimum diameter (No in step S305). In other words, the movement vector is not used for deriving a turning quantity. In the present embodiment, the minimum diameter is 4 m. However, the present embodiment is not limited thereto, and other values may be used, and different values may be used depending on the kind of car.

On the other hand, the turning quantity deriving portion 22d increments a derivation possible counter by "1" (step S307) if the turning center X is eqi al to or greater than the minimum diameter (Yes in step S305). The derivation possible counter is used to count the number of movement vectors which are used for deriving a turning quantity.

Next, the turning quantity deriving portion 22d inputs the value of the turning center X of the movement vector to a histogram (step S308). The histogram of the turning center X is a histogram indicating a distribution of values of the turning center X of movement vectors used for deriving a turning quantity. Specifically, the histogram has ranges in which a value of the turning center X is −4 m or less and +4 m or more as data regions. This is because a range in which a value of the turning center X is smaller than 4 m is excluded.

In the histogram of the turning center X, a range smaller than −150 m is sorted as a single region, and a range greater than +150 m is also sorted as a single region. In addition, in the histogram of the turning center X, in a range from −150 m to −4 m and a range from +4 m to +150 m, a single region is sorted at an interval of 100 mm. The turning quantity deriving portion 22d inputs a value of the derived turning center X to a region where the value is present.

The turning quantity deriving portion 22d determines whether or not the process has been performed on all movement vectors (step S309) after performing any one of the process of inputting a value of the turning center X of a movement vector to the histogram (step S308), the process of incrementing the derivation impossible counter by "1" (step S303), and the process of excluding a movement vector from a turning quantity derivation target (step S306). In other words, it is determined whether or not any one of the processes in steps S303, S306 and S308 has been performed on all extracted movement vectors.

If the process on all movement vectors is not completed (No in step S309), the turning quantity deriving portion 22d performs again the process on a movement vector on which the process has not been performed from step S302.

Figure 14:
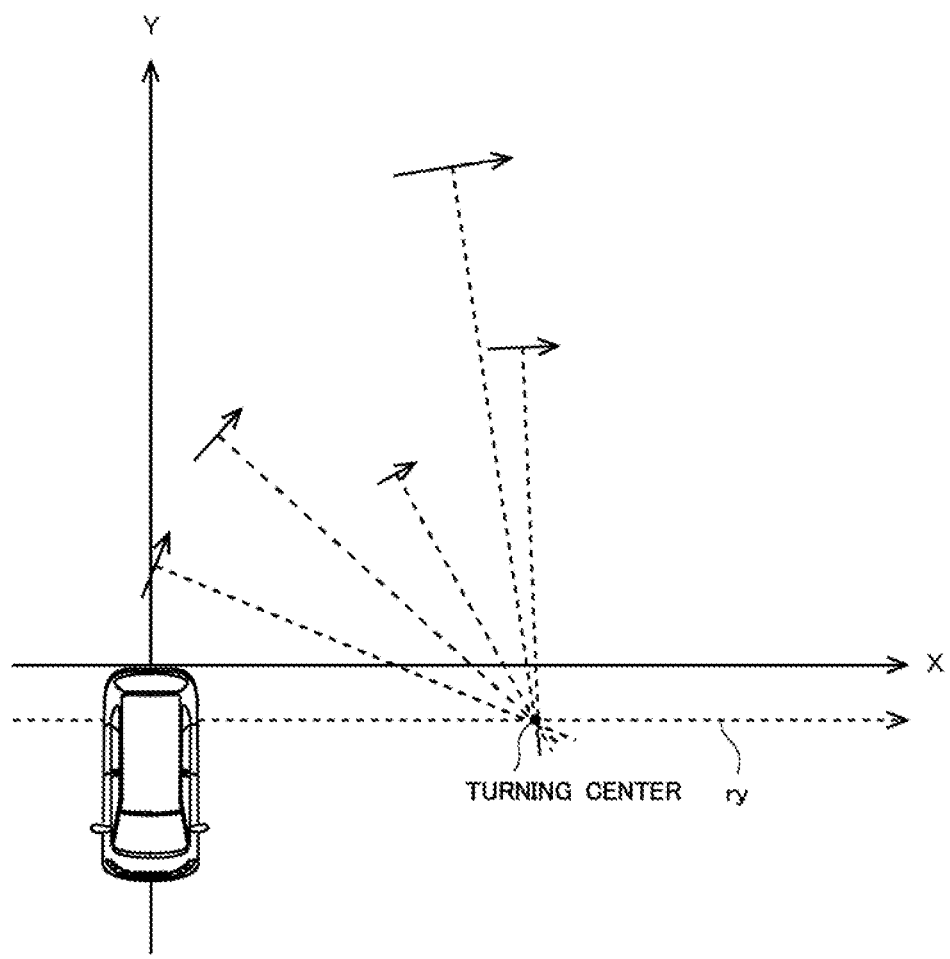
FIG. 14 is a diagram illustrating a method of deriving a turning center.

In the present embodiment, as illustrated in FIG. 14, values of the turning center X are derived for a plurality of movement vectors except for movement vectors which cannot be used for derivation or which are excluded. In addition, the respective values of the turning center X are input to the histogram. In other words, the histogram of the turning center X indicates an integrated value of movement vectors included in each region and a value of the turning center X correlated therewith.

Referring to FIG. 10 again, if the process on all of the extracted movement vectors has been completed (Yes in step S309), the turning quantity deriving portion 22d compares a value of the derivation possible counter with a value of the derivation impossible counter so as to determine whether or not the value of the derivation possible counter is equal to or greater than the value of the derivation impossible counter (step S310).

If the value of the derivation impossible counter is greater than the value of the derivation possible counter (No in step S310), the turning quantity deriving portion 22d retains the previous value without performing turning determination such as whether the host vehicle is turning or is moving straight (step S311). In other words, a result of the turning determination process performed in the previous frame is retained. If the value of the derivation impossible counter is greater, there is a high possibility that a turning quantity may not be accurately derived, and thus the result is not used for determination in the present process.

On the other hand, if the value of the derivation possible counter is equal to or greater than the value of the derivation impossible counter (Yes in step S310), the turning quantity deriving portion 22d performs the turning determination (step S312). In other words, it is determined whether the host vehicle is turning or is moving straight.

Figure 15:
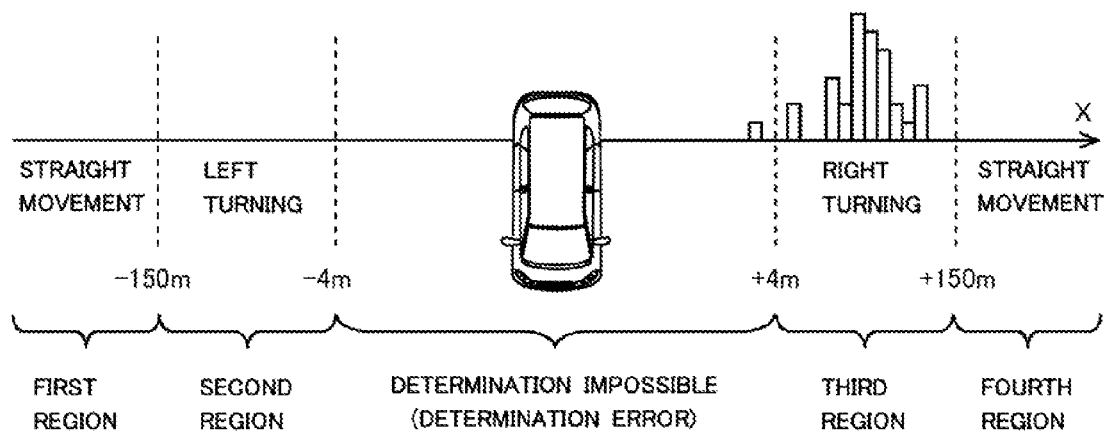
FIG. 15 is a diagram illustrating a turning determination process.

Specifically, the determination is performed on the basis of a region where a peak of the histogram of the turning center X is present. As illustrated in FIG. 15, for example, a region of the turning center X is divided into a first region of below −150 m, a second region of −150 m or more and below −4 m, a third region of 4 m or more and 150 m or less, and a fourth region of more than 150 m. In addition, in a case where a peak of the histogram of the turning center X is included in the first region or the fourth region, it is determined that the host vehicle is moving straight. In a case where a peak of the histogram is included in the second region, it is determined that the host vehicle is turning left, and in a case where a peak of the histogram is included in the third region, it is determined that the host vehicle is turning right. In other words, in an example illustrated in FIG. 15, it is determined that the host vehicle is turning right. In the above-described way, it can be determined whether the host vehicle is turning or is moving straight, and in a case where the host vehicle is turning, a direction thereof can be determined.

Referring to FIG. 9 again, next, the turning quantity deriving portion 22d performs a turning center determination process (step S202). The turning center determination process is a process of finally determining a position of the turning center X by using the histogram of the turning center X. In the histogram of the turning center X, in the second region and the third region, the number of movement vectors which are present within the width of 100 mm is integrated, and a value of the turning center X is also correlated therewith.

For this reason, it is possible to determine an accurate value of the turning center X by using a value of the turning center X of a movement vector which is present in a peak region. Specifically, all values of the turning center X included in a peak region of the histogram are input to an integral filter such as an IIR filter. Consequently, an output value thereof can be derived as an accurate value of the turning center X.

Next, the turning quantity deriving portion 22d performs a turning angle deriving process (step S203). The turning angle deriving process is a process of deriving an angle at which the host vehicle has turned with the turning center (X,Y) as a central point.

Figure 16:
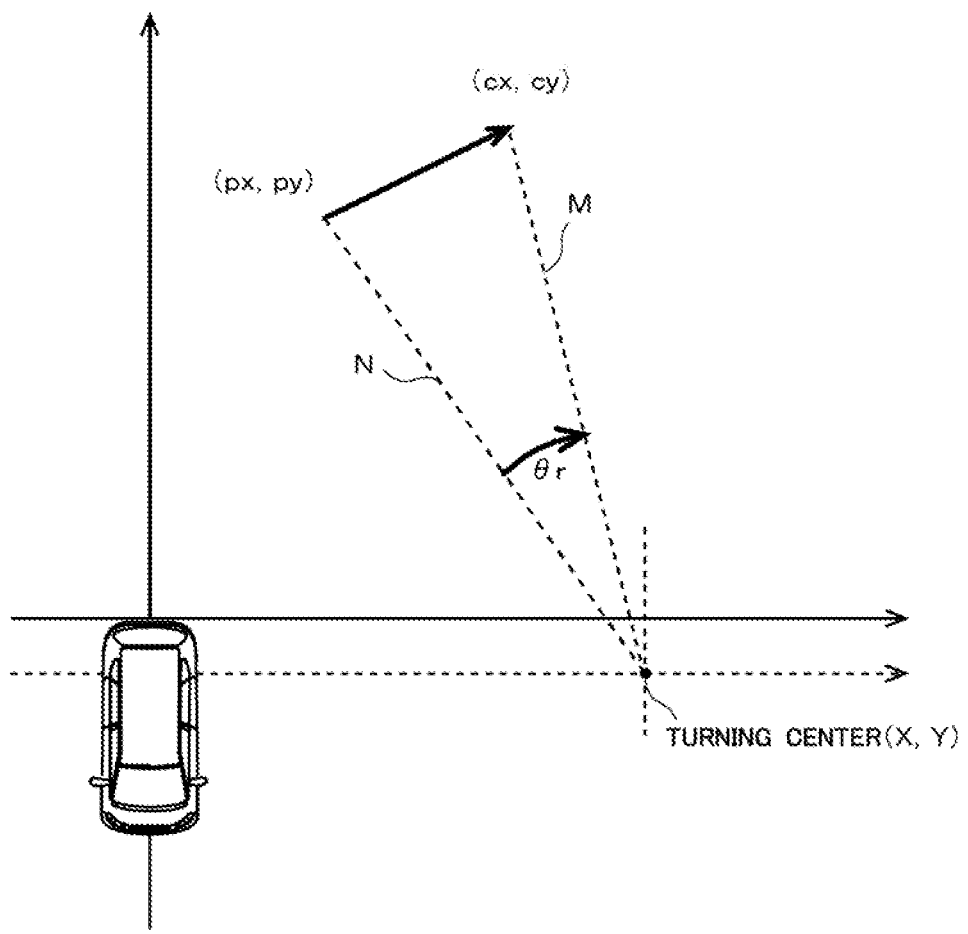
FIG. 16 is a diagram illustrating a method of deriving a turning angle.

Specifically, as illustrated in FIG. 16, the turning quantity deriving portion 22d derives an angle of a triangle formed by the turning center and both ends of the movement vector as a turning angle. If a straight line which connects the turning center to an end point of the movement vector is set as a straight line M, a slope Ms of the straight line M is derived by using Equation (6). Similarly, if a straight line which connects the turning center to a start point of the movement vector is set as a straight line N, a slope Ns of the straight line N is derived by using Equation (7).

$$\text{Slope } Ms = (\text{turning center } Y-cy)/(\text{turning center } X-ex) \tag{6}$$

$$\text{Slope } Ns = (\text{turning center } Y-py)/(\text{turning center } X-px) \tag{7}$$

If a turning angle is denoted by θr, θr is derived by using Equation (8).

$$\text{Turning angle } \theta r = \arctan((1+\text{slope } Ms \times \text{slope } Ns)/(\text{slope } Ms - \text{slope } Ns)) \tag{8}$$

Consequently, a turning angle corresponding to the movement vector is derived. In addition, movement vectors used for deriving a turning angle are all movement vectors which have been input to the histogram of the turning center X. Therefore, turning angles are derived in the above-described manner for all the movement vectors. Further, a histogram of the turning angle is created.

The histogram of the turning angle is obtained by dividing a range from −2.0° to +2.0° into regions in the units of 0.1°, and by sorting a value of a turning angle derived from each movement vector into a corresponding region. In other words, the histogram of the turning angle also indicates an integrated value of movement vectors included in each region and a value of a turning angle correlated therewith. The turning quantity deriving portion 22d averages values of all turning angles included in a peak region of the histogram so as to determine a turning angle. Specifically, a simple averaging process is performed in which a sum total of the values of turning angles is divided by the number of movement vectors. Thus, a turning angle is derived.

In addition, if it is determined that the host vehicle is moving straight in the turning determination process, a turning angle is 0°. Also in a case where a peak of the histogram is present in regions exceeding ±2.0°, a turning angle is 0°.

Referring to FIG. 9 again, next, the turning quantity deriving portion 22d performs a translation amount deriving process (step S204). A translation amount indicates a movement amount in a world coordinate system in which a direction of the host vehicle before moving is set to be the same as a direction of the host vehicle after moving (that is, turning of the host vehicle is canceled) (the translation amount may indicate a movement amount in the X axis direction and a movement amount in the Y axis direction).

Figure 17:
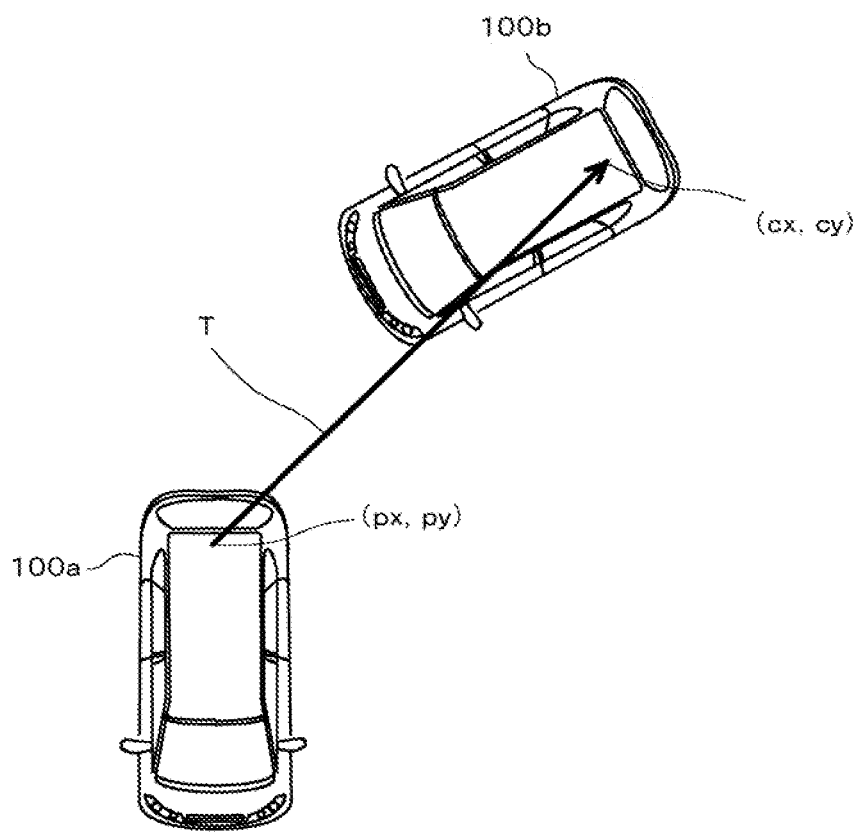
FIG. 17 is a diagram illustrating a method of deriving a translation amount.
Figure 18:
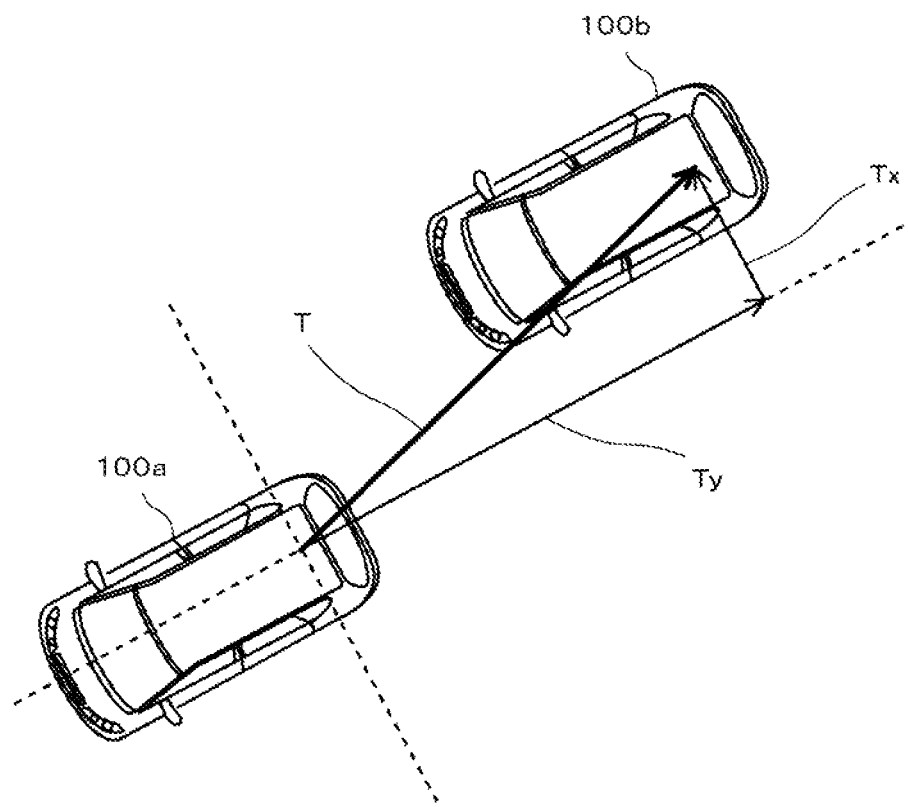
FIG. 18 is a diagram illustrating a method of deriving a translation amount.

Specifically, FIG. 17 illustrates an example in which the host vehicle 100a has moved to a position of the host vehicle 100b. A movement amount in this case is an amount indicated by a movement vector T. If turning of the host vehicle 100a before moving is canceled in this state, a state of the host vehicle 100a illustrated in FIG. 18 occurs. In other words, the host vehicle 100a and the host vehicle 100b are directed in the same direction. In addition, if a world coordinate system is set with a start point of the movement vector T as an origin, a movement amount Tx in the X axis direction of the movement vector T and a movement amount Ty in the Y axis direction thereof correspond to a translation amount.

Description thereof will be made more in detail. If a start point of the movement vector T is set to (px,py), and an end point thereof is set to (cx,cy), a relationship between the start point (px,py), the end point (cx,cy), and the above-described translation amount (Tx,Ty) is represented as in Equation (9) by using the turning angle Or derived in the turning angle deriving process.

$$\begin{bmatrix} cx \\ cy \end{bmatrix} = \begin{bmatrix} \cos\theta r & -\sin\theta r \\ \sin\theta r & \cos\theta r \end{bmatrix} \times \begin{bmatrix} px \\ py \end{bmatrix} + \begin{bmatrix} Tx \\ Ty \end{bmatrix} \quad (9)$$

The translation amount (Tx,Ty) can be derived by using Equation (10) converted from Equation (9).

$$\begin{bmatrix} Tx \\ Ty \end{bmatrix} = \begin{bmatrix} cx \\ cy \end{bmatrix} - \begin{bmatrix} \cos\theta r & -\sin\theta r \\ \sin\theta r & \cos\theta r \end{bmatrix} \times \begin{bmatrix} px \\ py \end{bmatrix} \quad (10)$$

In addition, movement vectors used for deriving a translation amount are also all movement vectors for deriving the turning angle. For this reason, translation amounts are derived in the same manner for all the movement vectors. Further, a histogram of the translation amount is created.

The histogram of the translation amount is obtained by dividing a predetermined range into regions in the units of 1 mm, and by sorting a value of a translation amount derived from each movement vector into a corresponding region. In other words, the histogram of the translation amount also indicates an integrated value of movement vectors included in each region and a value of a translation amount correlated therewith. The turning quantity deriving portion 22d determines a value of the maximum peak of the histogram as a final translation amount.

In a case where a movement vector is derived by using an optical flow, a reference image is updated when a movement amount, a turning quantity, or the like exceeds a predetermined value. Specifically, if a translation amount Ty of 45 mm is set as the predetermined value, when a translation amount derived in a certain frame is below 45 mm, a reference image is not updated, and the same image is used. When a translation amount is equal to or larger than 45 mm, an image of that frame is updated as the next reference image. Consequently, in a case where an object does not move much, a processing load can be reduced by not changing a reference image.

Referring to FIG. 5 again, next, the vehicle state determination portion 22e performs a vehicle state determination process (step S105). The vehicle state determination process is a process in which it is determined whether the host vehicle is moving or stopped and a movement state of the vehicle is also determined by using a past determination result. In the determination of a movement state of the vehicle, for example, in a case where the vehicle has been moving both in the past and at present, it is determined that the vehicle is moving. Details of the determination will be described later.

Figure 19:
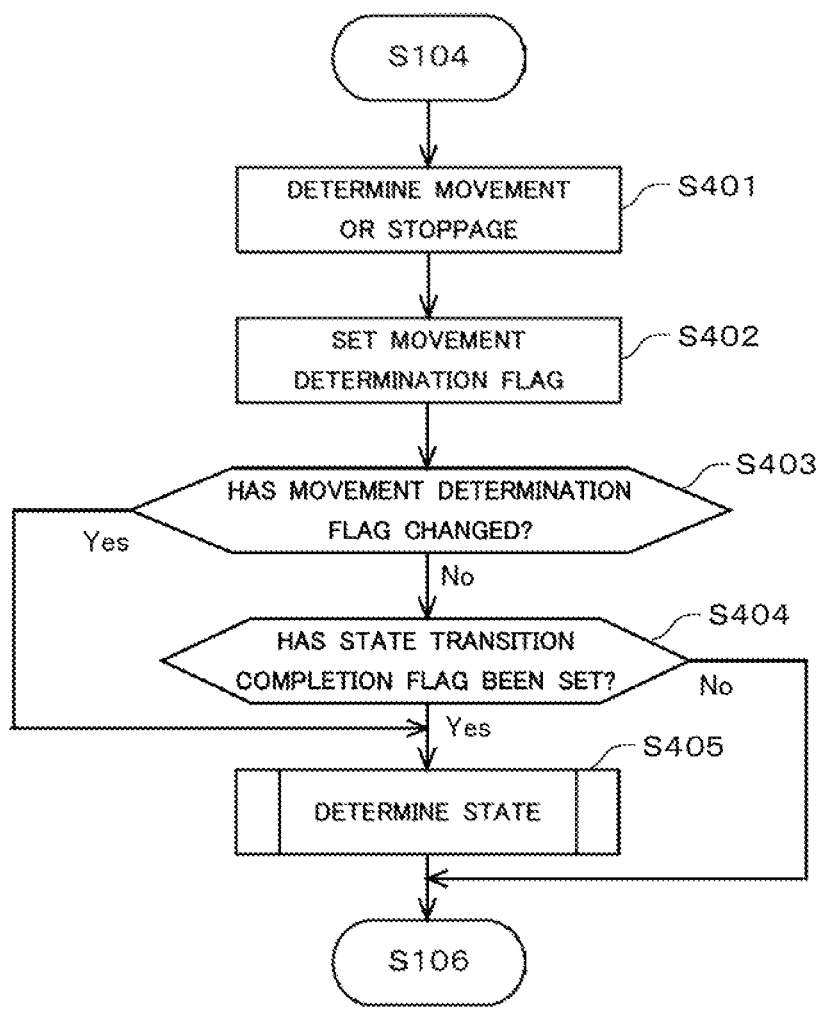
FIG. 19 is a flowchart illustrating a vehicle state determination process.

FIG. 19 is a flowchart illustrating the vehicle state determination process. As illustrated in FIG. 19, first, the vehicle state determination portion 22e determines whether the host vehicle is moving or stopped (step S401). This process is performed by using the translation amount Ty derived by the turning quantity deriving portion 22d. Specifically, a threshold value Th for determining the moving state or the stopped state is set in advance. In a case where the translation amount Ty is greater than the threshold value Th, the vehicle state determination portion 22e determines that the host vehicle is moving, and in a case where the translation amount Ty is equal to or smaller than the threshold value Th, it is determined that the vehicle is stopped. The threshold value Th may be set to any appropriate value as long as the value can be used to determine the moving state or the stopped state of the host vehicle, but may be set to, for example, 4 mm.

The vehicle state determination portion 22e sets a movement determination flag (step S402). The movement determination flag is a flag indicating whether or not the host vehicle is moving or stopped. In a case where it is determined that the host vehicle is moving, the vehicle state determination portion 22e sets the movement determination flag (this may be hereinafter referred to as "the movement determination flag being set to "movement"). In addition, in a case where it is determined that the host vehicle is stopped, the vehicle state determination portion 22e erases the movement determination flag (this may be hereinafter referred to as "the movement determination flag being set to "stoppage").

The vehicle state determination portion 22e determines whether or not the movement determination flag has changed (step S403). In other words, it is determined that the movement determination flag has changed by comparing the previous movement determination flag with the present movement determination flag.

If the movement determination flag has changed (Yes in step S403), the vehicle state determination portion 22e performs a state determination process (step S405). On the other hand, if the movement determination flag has not changed (No in step S403), the vehicle state determination portion 22e determines whether or not a state transition completion flag has been set (step S404). In a case where a state of the host vehicle changes from the moving state to the stopped state or changes from the stopped state to the moving state, the state transition completion flag is a flag indicating that the state change has been completed. This state transition completion flag will be described later.

If the state transition completion flag has been set (Yes in step S404), the vehicle state determination portion 22e performs the state determination process (step S405). On the other hand, if the state transition completion flag has not been set (No in step S404), the flow proceeds to the next process (step S 106) without performing the vehicle state determination process.

The state determination process is a process of determining a movement state of the host vehicle. Specifically, the movement state of the host vehicle includes a currently stopped state (hereinafter, referred to as a "first state"), a currently moving state (hereinafter, referred to as a "second state"), a state (hereinafter, referred to as a "third state") which is currently changing from the moving state to the stopped stage, and a state (hereinafter, referred to as a "fourth state") which is currently changing from the stopped state to the moving state. The state determination process is a process of determining any one of the first to fourth states.

Figure 20:
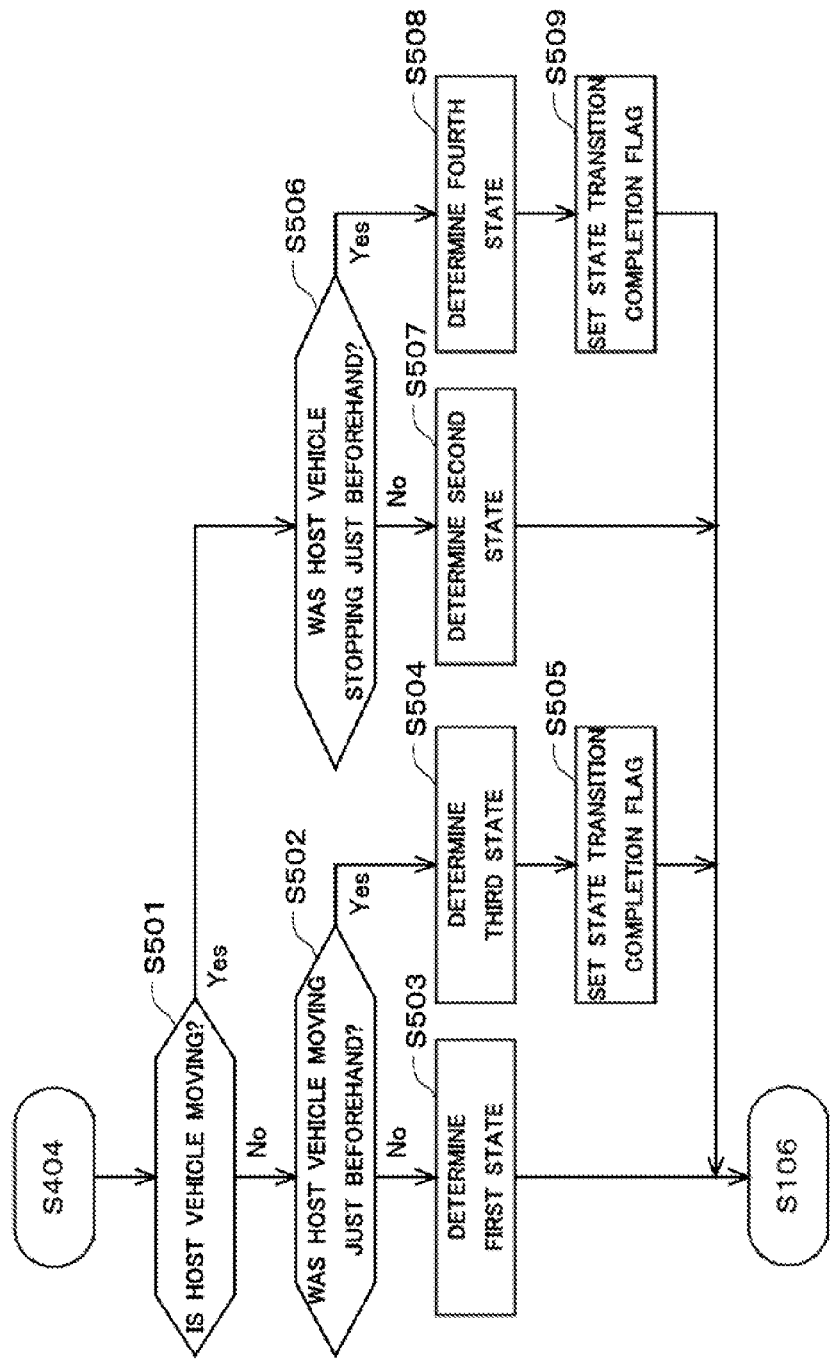
FIG. 20 is a flowchart illustrating a state determination process.

Detailed description thereof will be made with reference to the drawings. FIG. 20 is a flowchart illustrating the state determination process. First, the vehicle state determination portion 22e determines whether or not the host vehicle is moving (step S501). This determination is performed on the basis of a movement determination flag which is set in the present process. In other words, if the movement determination flag is set to "movement", the vehicle state determination portion 22e determines that the host vehicle is moving, and if the movement determination flag is set to "stoppage", the vehicle state determination portion 22e determines that the host vehicle is not moving (is stopped).

If the host vehicle is not moving (No in step S501), it is determined whether the host vehicle was moving just beforehand (step S502). This determination is performed on the basis of a movement determination flag which was set in the previous process. In other words, if the movement determination flag which was set in the previous process is set to "movement", the vehicle state determination portion 22e determines that the host vehicle was moving just beforehand, and if the movement determination flag which was set in the previous process is set to "stoppage", the vehicle state determination portion 22e determines that the host vehicle was not moving (was stopped) just beforehand.

If the host vehicle was not moving just beforehand (No in step S502), the vehicle state determination portion 22e determines that the host vehicle is in the first state (step S503). In other words, the host vehicle has been stopped both just beforehand and at present. On the other hand, if the host vehicle was moving just beforehand (Yes in step S502), the vehicle state determination portion 22e determines that the host vehicle is in the third state (step S504). In other words, the host vehicle is in a state which is changing from the moving state just beforehand to the stopped state at present. In a case where the change from the moving state to the stopped state has been completed in the third state, a state transition completion flag is set (step S505).

On the other hand, if the host vehicle is moving in step S501 (Yes in step S501), it is determined whether or not the host vehicle was stopped just beforehand (step S506). This determination is performed on the basis of a movement determination flag which was set in the previous process. In other words, if the movement determination flag which was set in the previous process is set to "stoppage", the vehicle state determination portion 22e determines that the host vehicle was stopped just beforehand, and if the movement determination flag which was set in the previous process is set to "movement", the vehicle state determination portion 22e determines that the host vehicle was not stopped (was moving) just beforehand.

If the host vehicle was not stopped just beforehand (No in step S506), the vehicle state determination portion 22e determines that the host vehicle is in the second state (step S507). In other words, the host vehicle was moving both just beforehand and is still moving at present. On the other hand, if the host vehicle was stopped just beforehand (Yes in step S506), the vehicle state determination portion 22e determines that the host vehicle is in the fourth state (step S508). In other words, the host vehicle is in a state which is changing from the stopped state just beforehand to the moving state at present. In a case where the change from the stopped state to the moving state has been completed in the fourth state, a state transition completion flag is also set (step S509). As mentioned above, the state determination process is performed.

Referring to FIG. 5, next, the drawing processing portion 22f performs a drawing process. The drawing process is a process of generating a display image in which a guide line is superimposed on an image of the host vehicle vicinity captured by the camera. In addition, in the present embodiment, the type, a length, or the like of a superimposed guide line is changed on the basis of a turning quantity derived in the turning quantity derivation process or a vehicle state determined in the vehicle state determination process. Hereinafter, detailed description thereof will be made.

Figures 21A, 21B:
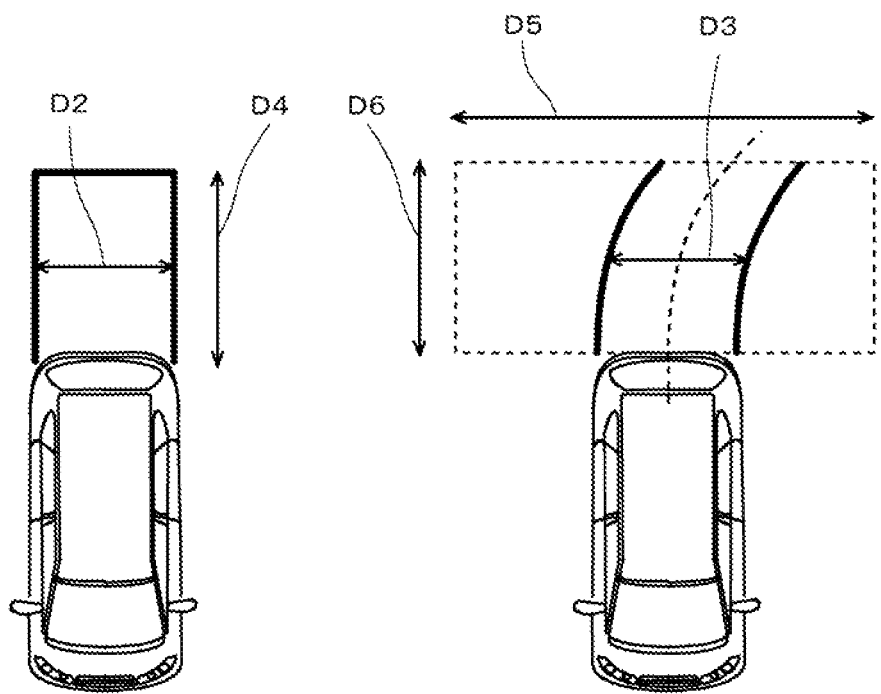
FIG. 21A is a diagram illustrating a fixed guide line.
FIG. 21B is a diagram illustrating a predicted guide line.

First, a description will be made of the type of guide line used in the present embodiment. A superimposed guide line includes a fixed guide line and a predicted guide line. The fixed guide line is a guide line which is drawn in a predefined region, and is predetermined a frame line which is displayed regardless of a movement path or the like of the host vehicle. As illustrated in FIG. 21 A, the fixed guide line of the present embodiment is a line surrounded by lines which extend backward of the host vehicle from the rear part of the host vehicle substantially at the same width therebetween as a vehicle width, and a line connecting the lines to each other.

On the other hand, the predicted guide line is a guide line which is drawn at a position which is predicted to be a movement path of the host vehicle. Specifically, as illustrated in FIG. 21 B, the predicted guide line includes lines which extend from the rear part of the host vehicle at the same width therebetween as a vehicle width, and extend to a position predicted to be a movement path.

A gap D2 of the fixed guide line and a gap D3 of the predicted guide line are substantially the same as the vehicle width. In other words, the gap D2 of the fixed guide line and the gap D3 of the predicted guide line are substantially the same as each other. As an example, each of the gaps D2 and D3 is 2.6 m. However, the gaps are not limited thereto and may be set as appropriate. A length D4 of the fixed guide line extending backward may be any length. As an example, the length D4 is 2 m.

The predicted guide line is drawn by using the above-described determined turning center. Specifically, a circle centering on a point which is moved by a half of the length of D2 in the +X direction from the turning center and a circle centering on a point which is moved by a half of the length of D2 in the −X direction from the turning center are drawn. For example, the predicted guide line can be drawn by drawing circles centering on points which are respectively moved by 1.3 m in the ±X directions from the turning center.

A region in which the predicted guide line is drawn is a region which has a predetermined width and length in the front and rear directions and left and right directions from the central part of the vehicle rear end. Specifically, for example, the region has widths of ±5 m (a total of 10 m) in a vehicle width direction D5 from the central part of the vehicle and a length of 2 m in front and rear directions D6. A predicted guide line included in a drawing region is a drawn target, but a portion exceeding the drawing region is not drawn. In other words, among predicted guide lines which are drawn in the above-described method, a portion included in the drawing region is drawn as an actual display target. A size of the drawing region is an example, and may be changed as appropriate.

In addition, in the present embodiment, the type of guide line is changed depending on a vehicle state, and a length of a predicted guide line is also changed. In other words, a length of the above-described drawing region in the front and rear directions of the vehicle is changed in a range from the maximum of 2 m to the minimum of 0 m depending on a vehicle state, and a length of a predicted guide line drawn in the range is also changed. In the present embodiment, as described above, as vehicle states, there are four types of states including the first state to the fourth state, and the type and a length of superimposed guide line in each state are changed. Hereinafter, modes related to four types of drawing methods which respectively correspond to the first to fourth states are referred to as a drawing mode A to a drawing mode D.

FIG. 22 is a diagram illustrating drawing methods corresponding to the respective drawing modes. As illustrated in FIG. 22, a fixed guide line is drawn in all the drawing modes. On the other hand, a predicted guide line may be drawn or may not be drawn (non-drawn) depending on the drawing mode. In addition, depending on the drawing mode, a length of the predicted guide line may be changed and be drawn. Drawing and non-drawing of the predicted guide line are performed by changing the length D6 of the drawing region described in FIG. 21B in the front and rear directions.

Specifically, the maximum value of 2 m of the length D6 of the drawing region is subject to length adjustment magnification so as to be changed. In other words, if the length adjustment magnification is changed in a range from 0.0 to 1.0, the length D6 is changed in a range from 0 m to 2 m. That is, the drawing region is changed, and thus a predicted guide line is drawn within a range of the changed drawing region. Therefore, a length of the predicted guide line can be changed.

Here, a description will be made of a drawing method in each drawing mode. When a vehicle state is the first state, the drawing processing portion 22f selects the drawing mode A. The drawing mode A is a mode in which a fixed guide line is drawn but a predicted guide line is not drawn. In other words, the drawing processing portion 22f draws only a fixed guide line by setting the length adjustment magnification to 0.0.

When a vehicle state is the second state, the drawing processing portion 22f selects the drawing mode B. The drawing mode B is a mode in which a fixed guide line is drawn and a predicted guide line is also drawn. In other words, the drawing processing portion 22f draws a fixed guide line, and also sets the length adjustment magnification to 1.0 so that the length D6 of the drawing region is set to the maximum "2m", thereby drawing a predicted guide line included within a range of the drawing region.

When a vehicle state is the third state, the drawing processing portion 22f selects the drawing mode C. The drawing mode C is a mode in which a fixed guide line is drawn and a predicted guide line is gradually shortened. In other words, the drawing processing portion 22f draws a fixed guide line, and also changes the length adjustment magnification from 1.0 to 0.0 so that the length D6 of the drawing region is shortened from the maximum "2 m". The drawing processing portion 22f draws the predicted guide line so that the predicted guide line is gradually shortened according to the change. The length D6 of the drawing region finally becomes 0 m, and thus the predicted guide line is not drawn.

When a vehicle state is the fourth state, the drawing processing portion 22f selects the drawing mode D. The drawing mode D is a mode in which a fixed guide line is drawn and a predicted guide line is gradually lengthened. In other words, the drawing processing portion 22f draws a fixed guide line, and also changes the length adjustment magnification from 0.0 to 1.0 so that the length D6 of the drawing region is lengthened from the minimum "0 m". The drawing processing portion 22f draws the predicted guide line so that the predicted guide line is gradually lengthened according to the change. The length D6 of the drawing region finally becomes the maximum "2 m", and thus the predicted guide line is drawn so as to be included within the range.

As mentioned above, in the present embodiment, in a case where the host vehicle is moving or a state thereof is changing from the stopped state to the moving state, a predicted guide line is drawn, and in a case where the host vehicle is stopped or a state thereof is changing from a moving state to the stopped state, a predicted guide line is not drawn. Consequently, it is possible to prevent a predicted guide line from being incorrectly displayed despite a state in which the host vehicle is not moving.

Figure 23:
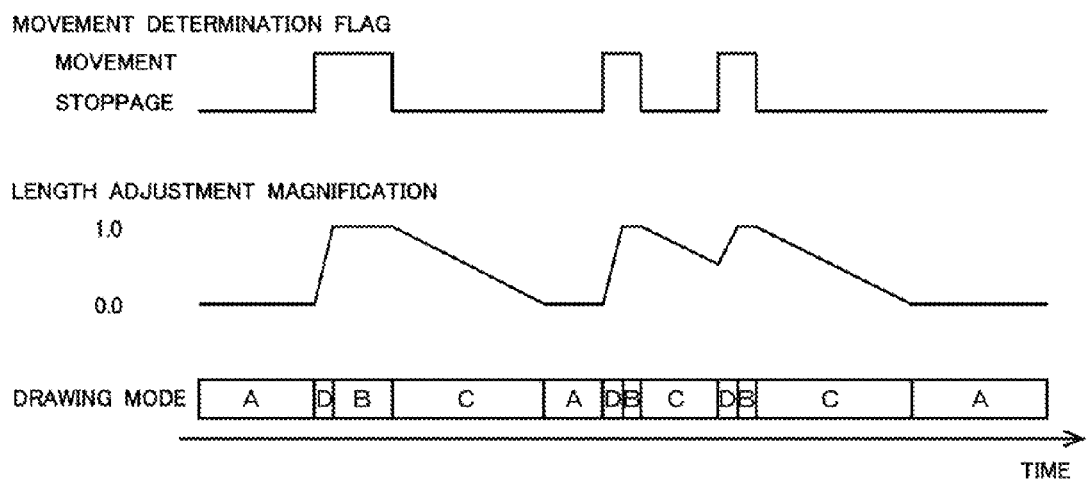
FIG. 23 is a timing chart illustrating a method of drawing a guide line.
Figure 24A:
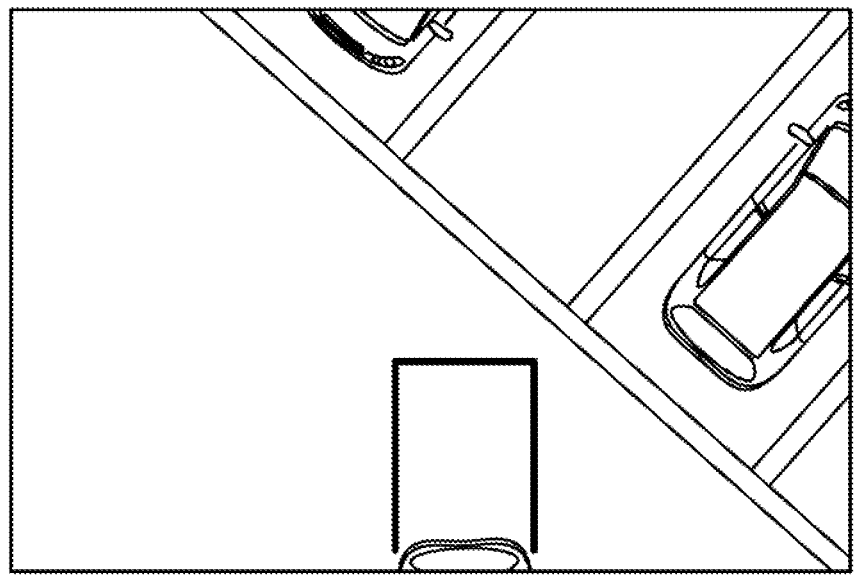
FIG. 24A is a diagram illustrating a display image including a guide line.
Figure 24B:
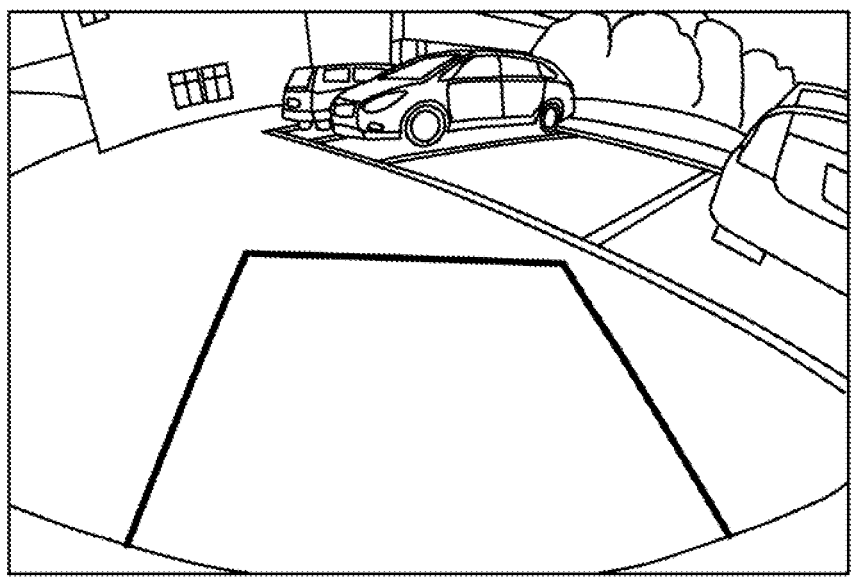
FIG. 24B is a diagram illustrating a display image including a guide line.

Next, a detailed description thereof will be made with reference to the drawings. FIG. 23 is a timing chart illustrating a correspondence relationship between the movement determination flag, the drawing mode, and the length adjustment magnification. As illustrated in FIG. 23, if the movement determination flag is set to "stoppage", and the previous movement determination flag is also set to "stoppage", a vehicle state is the first state. For this reason, the drawing processing portion 22f selects the drawing mode A and sets the length adjustment magnification to 0.0. In other words, the drawing processing portion 22f draws a fixed guide line and does not draw a predicted guide line. An image displayed in the above-described way is as illustrated in FIGS. 24A and 24B. FIG. 24A illustrates a display image in which a fixed guide line is drawn on an overhead image, and FIG. 24B illustrates a display image in which a fixed guide line is drawn on an image captured by the camera. While the movement determination flag does not change in a state of being set to "stoppage", the drawing mode A is maintained.

Referring to FIG. 23 again, next, if the movement determination flag changes to "movement", the state determination process is performed. In this case, since the previous movement determination flag is set to "stoppage", a vehicle state changes to the fourth state. For this reason, the drawing processing portion 22f selects the drawing mode D and changes the length adjustment magnification from 0.0 to 1.0. In other words, the drawing processing portion 22f draws a fixed guide line and also draws a predicted guide line while the predicted guide line is changed so as to be lengthened.

Figure 25A:
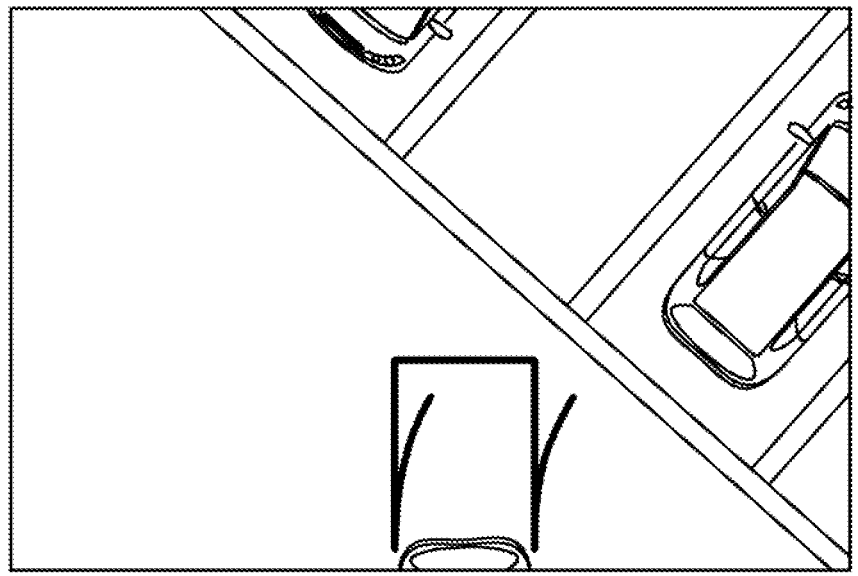
FIG. 25A is a diagram illustrating a display image including a guide line.
Figure 25B:
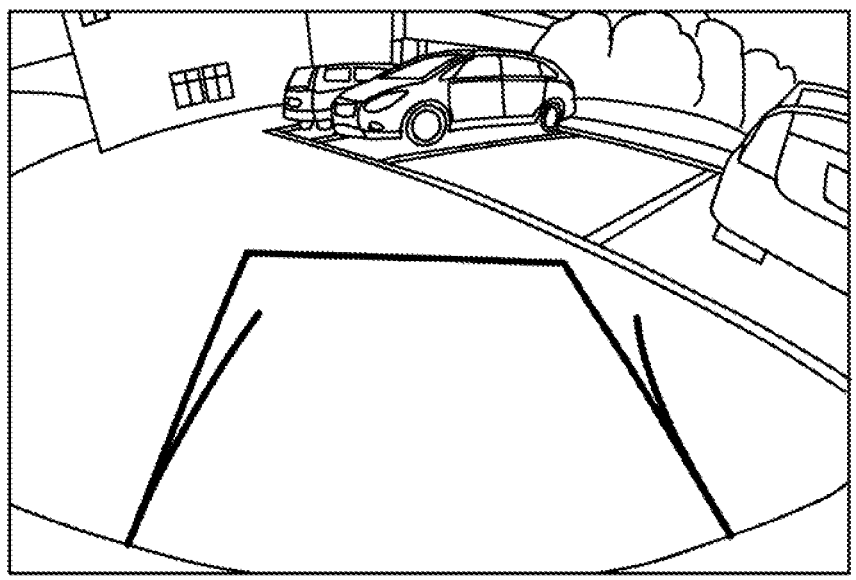
FIG. 25B is a diagram illustrating a display image including a guide line.

A change rate is arbitrary, but the length adjustment magnification is preferably changed so as to be 1.0 in the next frame. This is because a vehicle state of the fourth state indicates a state which changes from the stopped state to the moving state, and thus a predicted guide line is preferably displayed quickly in order to immediately check the predicted guide line after the movement. An image displayed in the above-described way is as illustrated in FIGS. 25A and 25B. FIGS. 25A and 25B illustrate a drawing state of predicted guide lines when the length D6 of the drawing region is currently being changed between 2 m and 0 m. FIG. 25A illustrates a display image in which respective guide lines are drawn on an overhead image, and FIG. 25B illustrates a display image in which the respective guide lines are drawn on an image captured by the camera.

Figure 26A:
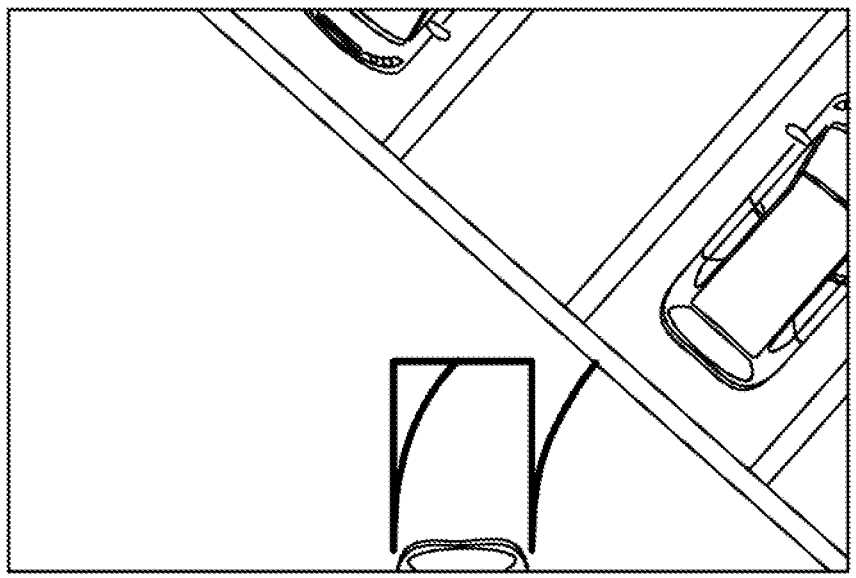
FIG. 26A is a diagram illustrating a display image including a guide line.
Figure 26B:
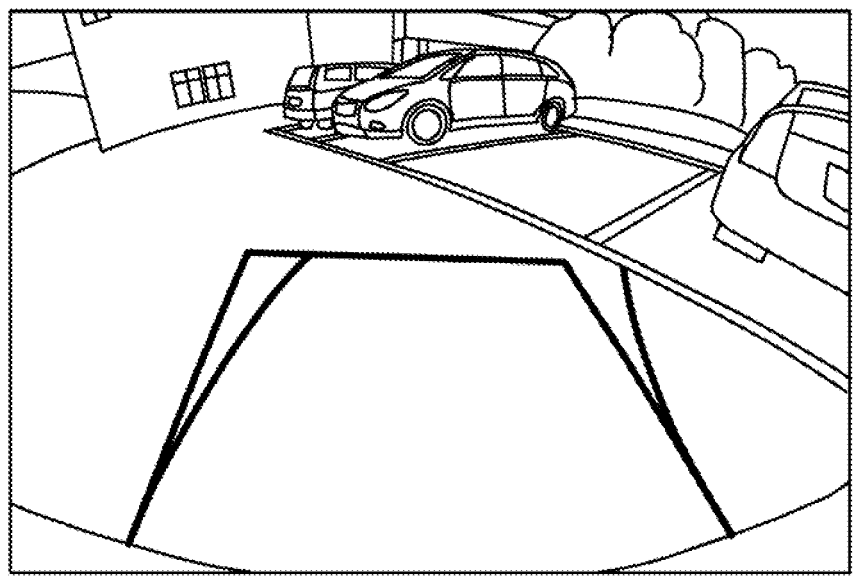
FIG. 26B is a diagram illustrating a display image including a guide line.

Referring to FIG. 23 again, if the length adjustment magnification is changed to 1.0, a state transition completion flag is set, and thus the state determination process is performed. In this case, since the movement determination flag is set to "movement", and the previous movement determination flag is also set to "movement", a vehicle state becomes the second state. For this reason, the drawing processing portion 22f selects the drawing mode B and retains the length adjustment magnification at 1.0. In other words, the drawing processing portion 22f draws a fixed guide line and also draws a predicted guide line so that the predicted guide line becomes the maximum "2 m". An image displayed in the above-described way is as illustrated in FIGS. 26A and 26B. FIGS. 26A and 26B illustrate a state in which a fixed guide line and a predicted guide lines are drawn so as to be the maximum length. FIG. 26A illustrates a display image in which respective guide lines are drawn on an overhead image, and FIG. 26B illustrates a display image in which the respective guide lines are drawn on an image captured by the camera. While the movement determination flag does not change in a state of being set to "movement", the drawing mode B is maintained. Referring to FIG. 23 again, next, if the movement determination flag changes to "stoppage", the state determination process is performed. In this case, since the previous movement determination flag is set to "movement", a vehicle state changes to the third state. For this reason, the drawing processing portion 22f selects the drawing mode C and changes the length adjustment magnification from 1.0 to 0.0. In other words, the drawing processing portion 22f draws a fixed guide line and also draws a predicted guide line while the predicted guide line is changed so as to be shortened. Since a vehicle state changes from the moving state to the stopped state, display of a predicted guide line becomes unnecessary.

A change rate is arbitrary, but is preferably lower than the change rate in the drawing mode D. This is because, a predicted guide line is preferably displayed so as to be immediately checked when a state changes from the stopped state to the moving state, whereas it becomes easier to recognize transition to the stopped state if the predicted guide line is gradually shortened than if the predicted guide line is not immediately drawn when a state changes from the moving state to the stopped state. An image displayed in the above-described way is as illustrated in FIGS. 25A and 25B.

Since a state transition completion flag is not set until the length adjustment magnification is changed to 0.0, the state determination process is not performed and the drawing mode C is maintained as long as the movement determination flag is not changed.

Referring to FIG. 23 again, if the length adjustment magnification is changed to 0.0, a state transition completion flag is set, and thus the state determination process is performed. In this case, if the movement determination flag is set to "stoppage", a vehicle state becomes the first state. For this reason, the drawing processing portion 22f selects the drawing mode A and retains the length adjustment magnification at 0.0. In other words, the drawing processing portion 22f draws a fixed guide line and does not draw a predicted guide line.

Then, similarly, a vehicle state is determined on the basis of a movement determination flag or a state transition completion flag, and a drawing mode corresponding to the vehicle state is selected. In addition, a process of drawing a guide line based on the selected drawing mode is performed.

For example, in a case where the drawing mode D is selected since there is a change in a movement determination flag in the middle of the length adjustment magnification being changed to 0.0 in the drawing mode C, the length adjustment magnification is changed again to 1.0 from the magnification which is currently being changed. As mentioned above, even when a drawing mode is changed in the middle of the process, a drawing process is performed according to the changed drawing mode.

As described above, in the present embodiment, a movement amount, a turning quantity, or the like of the host vehicle is derived by using an image captured by the camera, and thus it is possible to display a guide line obtained by predicting a movement path. Since the type of guide line to be displayed or a length thereof is changed depending on a state (moving or stopped) of the host vehicle, a change therein, or the like, it is possible to display an appropriate guide line according to the state.

2. <Modification Examples of Movement Vector Deriving Process>

As mentioned above, although the embodiment of the present invention has been described, the present invention is not limited to the embodiment and may have various modifications. Hereinafter, such modification examples will be described. All forms including the embodiment and forms described below may be combined with each other as appropriate.

First, modification examples of a movement vector deriving process will be described. In the embodiment, a description has been made of a configuration in which a movement vector of a road surface is derived by using a plurality of overhead images generated from images which are captured at different points in time, but the present invention is not limited thereto. For example, there may be a configuration in which a movement vector on an image is derived from an image captured by the camera, and is projected onto a road surface, thereby deriving a movement vector of the road surface.

In the embodiment, an overhead image is required to be generated from a captured image for each frame in order to derive a movement vector of the road surface. In contrast, in the present modification example, a movement vector of the road surface can be derived without generating an overhead image from a captured image, and thus it is possible to reduce a processing load.

Since image quality deteriorates if an overhead image is generated from a captured image, movement vector derivation accuracy may also be reduced, but, in the present modification example, a conversion process to an overhead image is not performed, and thus it is possible to prevent movement vector derivation accuracy from being reduced. Hereinafter, detailed description thereof will be made.

In the present modification example, a description will be made focusing on differences from the embodiment. In the present modification example, the overhead image generation portion 22a in the embodiment is omitted, and, instead, a road surface projection portion is provided.

A movement vector deriving portion of the present modification example has a function of deriving a movement vector by using a captured image acquired by the image acquisition unit 21. For example, the movement vector deriving portion extracts portions displaying the same subject from a plurality of images which are captured at different points in time, and derives a movement vector on the basis of each display position.

The road surface projection portion has a function of deriving a movement vector on the road surface by projecting the movement vector derived by the movement vector deriving portion onto a world coordinate system. Since the movement vector derived by the movement vector deriving portion indicates a movement amount on the captured image, the road surface projection portion projects the movement vector onto the road surface so as to derive a movement vector on the road surface, thereby performing conversion into an actual movement amount.

Figure 27A:
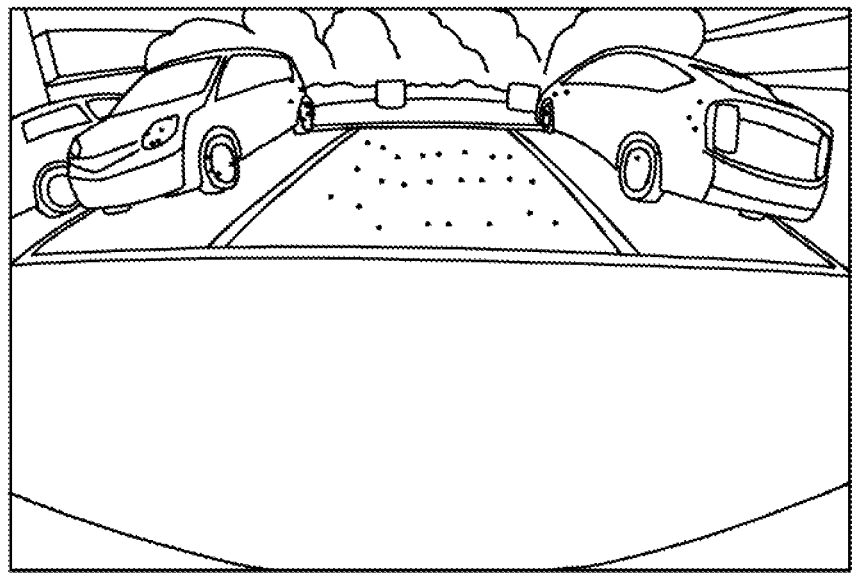
FIG. 27A is a diagram illustrating a method of deriving a movement vector.
Figure 27B:
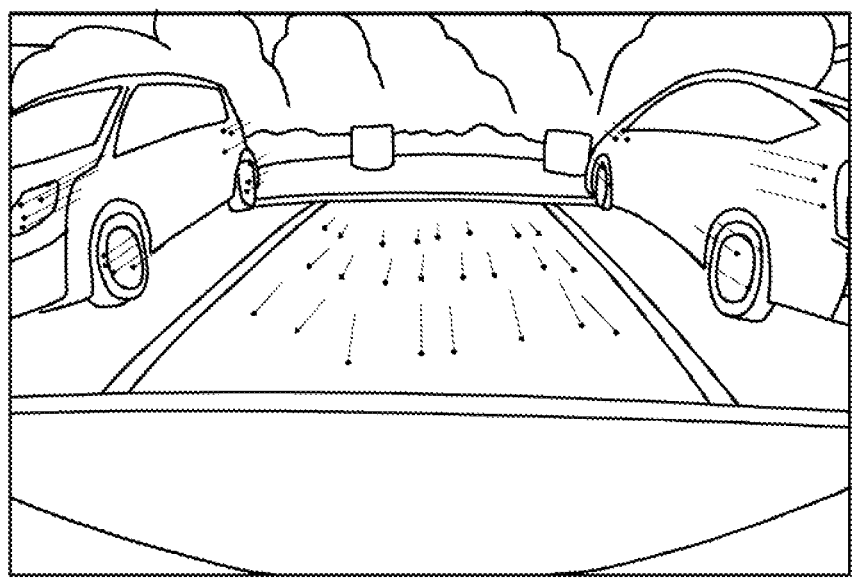
FIG. 27B is a diagram illustrating a method of deriving a movement vector.

Next, with reference to the drawings, a description will be made of a method of deriving a movement vector in the present modification example. FIGS. 27A and 27B are diagrams illustrating a method of deriving a movement vector by using a feature point method. FIGS. 27A and 27B respectively illustrate a captured image of the previous frame and a captured image of the subsequent frame.

As illustrated in FIGS. 27A and 27B, feature points in images which are captured at different points in time are correlated with each other, and thus a position of the feature point before being moved and a position of the feature point after being moved can be derived. FIG. 27B illustrates paths along which such feature points are moved. In other words, the movement vector deriving portion derives vectors indicating directions and magnitudes of the movement paths of the feature points as movement vectors on the images.

The road surface projection portion derives a movement vector on the road surface by projecting the movement vectors derived by the movement vector deriving portion onto the road surface (on the world coordinate system). Hereinafter, a detailed description thereof will be made.

In the present modification example, the movement vectors derived by the movement vector deriving portion are vectors on the image, and cannot be used as a movement amount of the host vehicle without being changed. For this reason, the movement vectors on the image are required to be converted into movement vectors on the road surface. In other words, the road surface projection portion derives a movement vector on the road surface by projecting the movement vectors on the image onto the road surface in order to derive an actual movement amount corresponding to each movement vector on the image.

Figure 28:
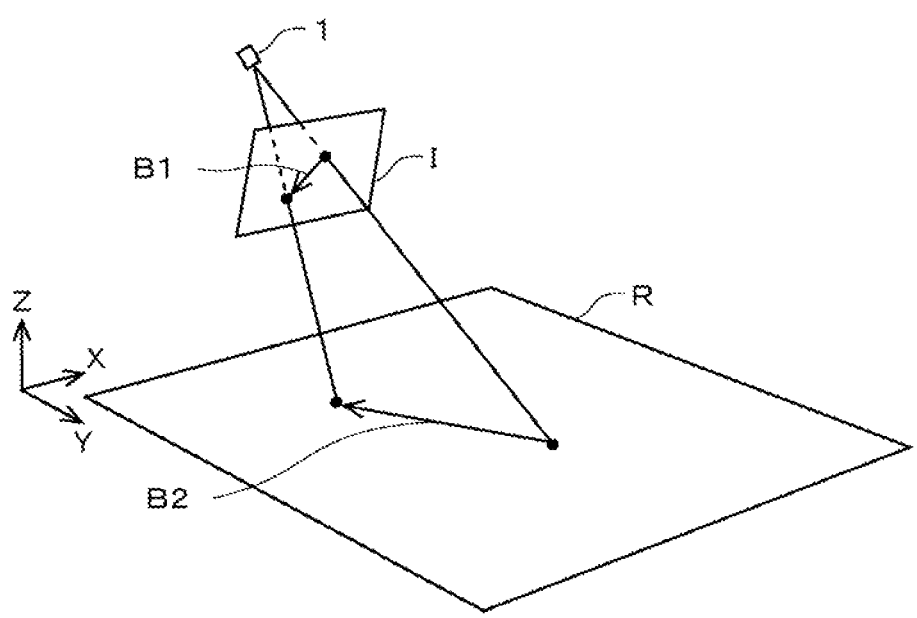
FIG. 28 is a diagram illustrating a method of deriving a movement vector.

Here, with reference to the drawings, a description will be made of a process of projecting a movement vector onto the road surface. FIG. 28 is a diagram illustrating a concept of a process of converting a movement vector on a captured image into a movement vector on a road surface.

As illustrated in FIG. 28, a movement vector B1 on a captured image 1 of the camera 1 is projected on a road surface R so as to be converted into a movement vector B2 on the road surface R. Specifically, extend a line which connects a viewpoint of the camera 1 and a start point of the movement vector B1 on the captured image I, and a point at which the line intersects the road surface R becomes a start point of the movement vector B2. Similarly, extend line which connects the viewpoint of the camera 1 and an end point of the movement vector B1 on the captured image I, and a point at which the line intersects the road surface R becomes an end point of the movement vector B2. In FIG. 28, the captured image 1 is a conceptual image used when the movement vector B1 on an image is converted into the movement vector B2 on the road surface and is not an image plane which exists in real space.

Figure 29:
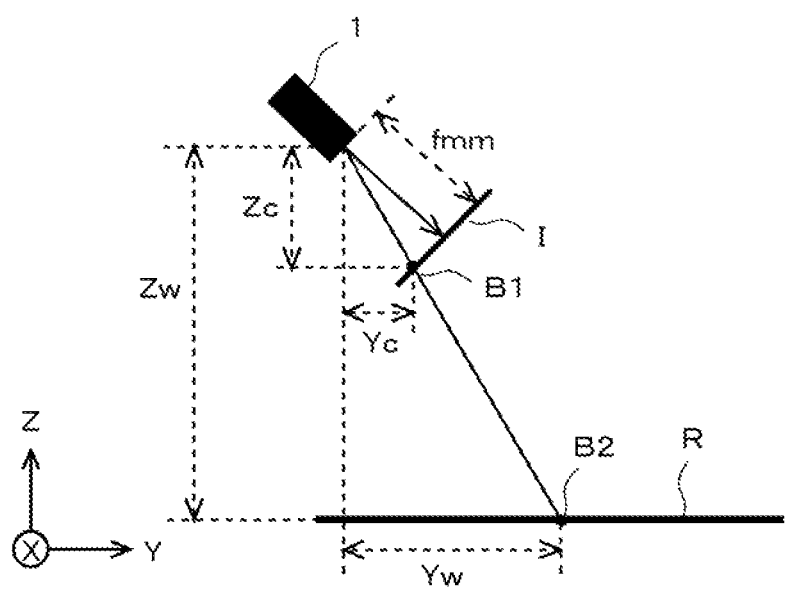
FIG. 29 is a diagram illustrating a method of deriving a movement vector.

The start point and the end point of the movement vector B2 on the road surface can be derived from XY coordinates in a case where the road surface R is set as an XY plane, and a position of the camera 1 is set as an origin. A description will be made of a method of deriving the XY coordinates with reference to the drawings. FIG. 29 is a diagram illustrating a method of deriving coordinates of a movement vector on the road surface.

FIG. 29 is a diagram obtained when a state in which the movement vector B1 on the captured image 1 is projected onto the road surface R is viewed from a YZ plane. In other words, FIG. 29 is a diagram viewed from the X axis direction. In addition, fmm in FIG. 29 indicates a focal length of the camera 1, and Zw indicates a distance (height) in the Z axis direction between a viewpoint position of the camera 1 and the road surface R. Further, Ye and Zc respectively indicate distances in the Y axis direction and the Z axis direction between the viewpoint position of the camera 1 and the position of the movement vector B1. These values are values on the basis of a specification (a lens model, a focal length, or the like) of the camera 1, or an installation position or angle of the camera 1 with respect to the road surface.

A Y coordinate (Yw) of the movement vector B2 on the road surface onto which the movement vector B1 is projected can be derived as follows.

$$Yw = \frac{Zw}{Zc} \times Yc$$

Similarly, an X coordinate (Xw) can be derived as follows.

$$Xw = \frac{Zw}{Zc} \times Xc$$

In addition, Xc indicates a distance in the X axis direction of the distances between the viewpoint position of the camera 1 and the movement vector B1.

Consequently, since XY coordinates of the movement vector B2 obtained by projecting the movement vector B1 onto the road surface are defined, coordinates of the start point and the end point of the movement vector B2 are derived, and thus the movement vector B2 on the road surface can be derived.

3. <Other Modification Examples>

In the above-described embodiment, a description has been made of a configuration in which, if transition to the drawing mode C occurs, the length adjustment magnification is reduced from 1.0, and thus a drawing region is also reduced, but the present invention is not limited thereto. For example, there may be a configuration in which, when transition to the drawing mode C occurs, the length adjustment magnification is reduced after a predetermined period of time has elapsed from the transition.

For example, in a case where the host vehicle is moved in reverse and is then parked, movement and stoppage may be repeatedly performed since the host vehicle travels at a low speed. In this case, if a process of shortening, or lengthening a predicted guide line is frequently performed, a driver may have difficulty in viewing the predicted guide line. Therefore, the configuration can prevent such a situation.

In the above-described embodiment, a description has been made of a configuration in which a predicted guide line is not drawn or is shortened when the host vehicle is stopped, but the present invention is not limited thereto. For example, there may be a configuration in which a driver is notified of information indicating that the host vehicle is currently stopped while display of a predicted guide line is maintained. A notification method may be selected as appropriate, and, for example, a method of displaying the information on a display apparatus or a method of outputting the information in the form of voice may be used. Consequently, even when the host vehicle is stopped, wrong information is not provided to a driver.

In the above-described embodiment, an image of the host vehicle vicinity captured by the camera is used, and thus it is possible to display a guide line obtained by predicting a movement path. Therefore, prediction of a movement path can be realized without separately providing other sensors such as a steering angle sensor. However, other sensors such as the steering angle sensor may be separately provided, and may realize a fail-safe function.

For example, there is a configuration in which a guide line obtained by predicting a movement path by using other sensors such as a steering angle sensor is displayed at a time of normal operation, and a guide line is displayed in the method described in the embodiment in a case where other sensors fail. In the above-described way, even in a case where other sensors fail, it is possible to prevent a situation in which a guide line is not displayed.

According to the present invention, even in a case where a state changes from a moving state to a stopped state, a second support image in which a line of a movement path is shorter than in the movement state is superimposed before a display image in which only a first support image is superimposed is generated, and thus it is possible to easily recognize changing to the stopped state.

According to the present invention, since the image processing apparatus can determine the moving state or the stopped of a vehicle through image processing, the determination can be performed without separately providing a sensor or the like for determining the moving state or the stopped state of the vehicle.

In the above-described embodiment, some of the various functions described to be realized by software by the CPU performing a calculation process according to the program may be realized by an electrical hardware circuit. Conversely, some of the functions described to be realized by a hardware circuit may be realized by software.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus that processes an image, the image processing apparatus comprising:
an image acquisition portion that acquires a captured image from an imaging apparatus which captures an image of a vicinity of a vehicle; and
an image generator that generates a display image in which a support image for supporting driving is superimposed on the acquired captured image captured by the imaging apparatus, the image generator being configured to (i) make a determination as to whether the vehicle is in a stopped state or a moving state, and (ii) select a type of the support image to be superimposed on the acquired captured image in the display image based on the determination as to whether the vehicle is in the stopped state or the moving state, wherein in a case where the vehicle is moving or a state is changing from the stopped state to the moving state, the support image includes a predicted guide line, and in a case where the vehicle is stopped or a state is changing from the moving state to the stopped state, the support image does not include the predicted guide line.

2. The image processing apparatus according to claim 1, wherein
the types of the support image include a first support image in which a line is drawn in a predefined region and a second support image in which a line is drawn along a predicted movement path of the vehicle, and
the image generator generates the display image in which the first support image and the second support image are superimposed on the acquired captured image when the vehicle is in the moving state, and generates the display image in which the first support image, but not the second support image, is superimposed on the acquired captured image when the vehicle is in the stopped state.

3. The image processing apparatus according to claim 2, wherein
after the state of the vehicle changed from the moving state to the stopped state, the image generator generates the display image such that a length of a line showing the predicted movement path is shortened in the display image in which the first support image and the second support image are superimposed on the acquired captured image before generating the display image in which the first support image, but not the second support image, is superimposed on the acquired captured image.

4. The image processing apparatus according to claim 1, wherein
the image generator derives a movement amount of the vehicle, and
the image generator makes the determination as to whether the vehicle is in the moving state or the stopped state based on the derived movement amount.

5. The image processing apparatus according to claim 1, wherein the image generator is further configured to make a determination as to whether the vehicle was moving or not moving just beforehand and at the present, and the support image is displayed based on this determination.

6. The image processing apparatus according to claim 1, wherein the support image superimposed on the acquired captured image in the display image when the vehicle is in the moving state is based on a histogram of a turning angle.

7. A driving support system which supports driving of a vehicle, the driving support system comprising:
an imaging apparatus that captures an image of a vicinity of the vehicle;
an image processing apparatus that processes a captured image captured by the imaging apparatus so as to generate a display image; and a display apparatus that displays the display image,
wherein the image processing apparatus includes
an image acquisition portion that acquires the captured image from the imaging apparatus; and
an image generator that generates the display image in which a support image for supporting driving is superimposed on the acquired captured image captured by the imaging apparatus, the image generator being configured to (i) make a determination as to whether the vehicle is in a stopped state or a moving state, and (ii) select a type of the support image to be superimposed on the acquired capture image in the display image based on the determination as to whether the vehicle is in the stopped state or the moving state, wherein in a case where the vehicle is moving or a state is changing from the stopped state to the moving state, the support image includes a predicted guide line, and in a case where the vehicle is stopped or a state changing from the moving state to the stopped state, the support image does not include the predicted guide line.

8. The driving support system according to claim 7, wherein
the types of the support image include a first support image in which a line is drawn in a predefined region and a second support image in which a line is drawn along a predicted movement path of the vehicle, and
the image generator generates the display image in which the first support image and the second support image are superimposed on the acquired captured image when the vehicle is in the moving state, and generates the display image in which the first support image, but not the second support image, is superimposed on the acquired captured image when the vehicle is in the stopped state.

9. The driving support system according to claim 8, wherein
when the state of the vehicle changes from the moving state to the stopped state, the image generator generates the display image such that a length of a line showing the predicted movement path is shortened in the display image in which the first support image and the second support image are superimposed on the acquired captured image before generating the display image in which the first support image, but not the second support image, is superimposed on the acquired captured image.

10. The driving support system according to claim 7, wherein
the image generator derives a movement amount of the vehicle, and
the image generator makes the determination as to whether the vehicle is in the moving state or the stopped state based on the derived movement amount.

* * * * *